United States Patent
Mital et al.

(10) Patent No.: US 11,477,197 B2
(45) Date of Patent: Oct. 18, 2022

(54) SIDECAR ARCHITECTURE FOR STATELESS PROXYING TO DATABASES

(71) Applicant: Cyral Inc., Redwood City, CA (US)

(72) Inventors: Manav Ratan Mital, Mountain View, CA (US); Srinivas Nageswarrao Vadlamani, San Jose, CA (US); Pramod Chandraiah, Pleasanton, CA (US); Hugo Araújo de Sousa, Belo Horizonte (BR)

(73) Assignee: Cyral Inc., Milpitas, CA (US)

( * ) Notice: Subject to any disclaimer, the term of this patent is extended or adjusted under 35 U.S.C. 154(b) by 0 days.

(21) Appl. No.: 16/817,366

(22) Filed: Mar. 12, 2020

(65) Prior Publication Data

US 2020/0236108 A1    Jul. 23, 2020

Related U.S. Application Data

(63) Continuation-in-part of application No. 16/548,732, filed on Aug. 22, 2019.

(60) Provisional application No. 62/891,795, filed on Aug. 26, 2019, provisional application No. 62/840,847, filed on Apr. 30, 2019, provisional application No. 62/758,223, filed on Nov. 9, 2018, provisional application No. 62/733,013, filed on Sep. 18, 2018.

(51) Int. Cl.
| | |
|---|---|
| *H04L 29/06* | (2006.01) |
| *H04L 29/08* | (2006.01) |
| *H04L 9/40* | (2022.01) |
| *H04L 69/329* | (2022.01) |
| *H04L 69/326* | (2022.01) |

(52) U.S. Cl.
CPC ...... *H04L 63/0884* (2013.01); *H04L 63/0428* (2013.01); *H04L 63/20* (2013.01); *H04L 63/306* (2013.01); *H04L 69/326* (2013.01); *H04L 69/329* (2013.01)

(58) Field of Classification Search
CPC ............. H04L 67/2842; H04L 63/0884; H04L 63/306; H04L 69/329; H04L 63/20; H04L 63/0428; H04L 69/326
See application file for complete search history.

(56) References Cited

U.S. PATENT DOCUMENTS

| | | |
|---|---|---|
| 6,275,818 B1 | 8/2001 | Subramanian |
| 7,895,649 B1 | 2/2011 | Brook |
| 8,793,805 B1 | 7/2014 | Johansson |
| 8,959,633 B1 | 2/2015 | Dokey |

(Continued)

FOREIGN PATENT DOCUMENTS

| WO | 2018063583 | 4/2018 |
|---|---|---|

OTHER PUBLICATIONS

Anwar et al., From Intrustion Detection to an Intrusion Response System: Fundamentals, Requirements, and Future Directions, Algorithms, MDPI, published Mar. 27, 2017, pp. 1-24.

(Continued)

*Primary Examiner* — El Hadji M Sall
(74) *Attorney, Agent, or Firm* — Van Pelt, Yi & James LLP

(57) ABSTRACT

A mechanism for providing connection to a database is described. A connection to the database is intercepted. The connection is assigned to an instance of the database. A sidecar is configured to proxy the connection to the database. The sidecar is stateless and passes all communications for the connection to the instance of the database.

19 Claims, 13 Drawing Sheets

(56) References Cited

U.S. PATENT DOCUMENTS

| | | | |
|---|---|---|---|
| 9,088,450 B2 | 7/2015 | Jung | |
| 9,117,062 B1 | 8/2015 | Fitch | |
| 9,137,131 B1 | 9/2015 | Sarukkai | |
| 9,479,532 B1 | 10/2016 | Gerlach | |
| 9,800,474 B1 | 10/2017 | Bush | |
| 9,819,648 B1 | 11/2017 | Chilakapati | |
| 10,025,941 B1 | 7/2018 | Griffin | |
| 10,051,079 B1 | 8/2018 | Kaukl | |
| 10,164,944 B1 | 12/2018 | Felstaine | |
| 10,171,423 B1 | 1/2019 | Woodberg | |
| 10,192,072 B1 | 1/2019 | Galvin, Jr. | |
| 10,318,762 B1 | 6/2019 | Buckingham | |
| 10,469,425 B1 | 11/2019 | Conley | |
| 10,827,026 B1 | 11/2020 | Kaukl | |
| 10,936,738 B1 | 3/2021 | Roberts | |
| 10,963,590 B1 | 3/2021 | Dash | |
| 11,223,622 B2 | 1/2022 | Mital | |
| 2002/0046275 A1 | 4/2002 | Crosbie | |
| 2003/0065711 A1* | 4/2003 | Acharya | H04L 69/162 709/203 |
| 2003/0154406 A1 | 8/2003 | Honarvar | |
| 2004/0266533 A1 | 12/2004 | Gentles | |
| 2006/0075228 A1 | 4/2006 | Black | |
| 2006/0210071 A1 | 9/2006 | Chandran | |
| 2007/0061318 A1 | 3/2007 | Azizi | |
| 2008/0201772 A1 | 8/2008 | Mondaeev | |
| 2008/0262991 A1 | 10/2008 | Kapoor | |
| 2009/0046726 A1 | 2/2009 | Cabrera | |
| 2010/0067402 A1 | 3/2010 | Navarro | |
| 2010/0274892 A1 | 10/2010 | Legrand | |
| 2010/0281541 A1 | 11/2010 | Stolfo | |
| 2010/0332845 A1 | 12/2010 | Asaka | |
| 2011/0119487 A1 | 5/2011 | Alexander | |
| 2011/0307490 A1 | 12/2011 | Chow | |
| 2012/0066363 A1* | 3/2012 | Somogyi | H04L 67/1002 709/223 |
| 2012/0066769 A1 | 3/2012 | Latchem | |
| 2012/0331283 A1 | 12/2012 | Chandran | |
| 2013/0007880 A1 | 1/2013 | Bosco | |
| 2013/0067023 A1 | 3/2013 | Joy | |
| 2013/0111220 A1 | 5/2013 | Friedlander | |
| 2013/0159169 A1 | 6/2013 | Schneeman | |
| 2013/0318348 A1 | 11/2013 | Lebron | |
| 2014/0013452 A1 | 1/2014 | Aissi | |
| 2014/0047551 A1 | 2/2014 | Nagasundaram | |
| 2014/0053244 A1 | 2/2014 | Raman | |
| 2014/0122714 A1 | 5/2014 | Jung | |
| 2014/0298030 A1 | 10/2014 | Akiyama | |
| 2014/0310183 A1 | 10/2014 | Weber | |
| 2014/0351573 A1 | 11/2014 | Martini | |
| 2014/0380054 A1 | 12/2014 | Roth | |
| 2014/0380404 A1 | 12/2014 | Raj | |
| 2015/0032855 A1 | 1/2015 | Wang | |
| 2015/0033340 A1 | 1/2015 | Giokas | |
| 2015/0058622 A1 | 2/2015 | Sturgill | |
| 2015/0135293 A1 | 5/2015 | Mookiah | |
| 2015/0156183 A1 | 6/2015 | Beyer | |
| 2015/0193279 A1 | 7/2015 | Lacivita | |
| 2015/0215267 A1 | 7/2015 | Kagan | |
| 2015/0237027 A1 | 8/2015 | Kim | |
| 2015/0244696 A1 | 8/2015 | Ma | |
| 2015/0350228 A1 | 12/2015 | Baxley | |
| 2016/0057208 A1 | 2/2016 | Parikh | |
| 2016/0057234 A1 | 2/2016 | Parikh | |
| 2016/0078446 A1 | 3/2016 | Trostle | |
| 2016/0132214 A1 | 5/2016 | Koushik | |
| 2016/0134616 A1 | 5/2016 | Koushik | |
| 2016/0171236 A1 | 6/2016 | Konik | |
| 2016/0255137 A1 | 9/2016 | Bleau | |
| 2016/0261621 A1 | 9/2016 | Srivastava | |
| 2016/0321277 A1 | 11/2016 | Costabello | |
| 2016/0335151 A1 | 11/2016 | Swierk | |
| 2016/0337400 A1 | 11/2016 | Gupta | |
| 2016/0366113 A1 | 12/2016 | Dawoud | |
| 2017/0017959 A1 | 1/2017 | Keresman, III | |
| 2017/0046143 A1* | 2/2017 | Kochhar | G06F 8/60 |
| 2017/0063793 A1 | 3/2017 | Galbreath | |
| 2017/0093916 A1 | 3/2017 | Arumugam | |
| 2017/0132431 A1 | 5/2017 | Gonzalez Blanco | |
| 2017/0171170 A1 | 6/2017 | Sun | |
| 2017/0208079 A1 | 7/2017 | Cammarota | |
| 2017/0230352 A1 | 8/2017 | Chen | |
| 2017/0242784 A1 | 8/2017 | Heorhiadi | |
| 2017/0250979 A1 | 8/2017 | Benson | |
| 2017/0289292 A1 | 10/2017 | Arning | |
| 2017/0374070 A1 | 12/2017 | Shah | |
| 2018/0027006 A1 | 1/2018 | Zimmermann | |
| 2018/0048464 A1 | 2/2018 | Lim | |
| 2018/0060612 A1 | 3/2018 | Gladwin | |
| 2018/0060861 A1 | 3/2018 | Schoultz | |
| 2018/0089454 A1 | 3/2018 | Iyer | |
| 2018/0124001 A1 | 5/2018 | Onusko | |
| 2018/0205552 A1 | 7/2018 | Struttmann | |
| 2018/0218173 A1 | 8/2018 | Perkins | |
| 2018/0219890 A1 | 8/2018 | Rehak | |
| 2018/0285591 A1 | 10/2018 | Thayer | |
| 2018/0307857 A1 | 10/2018 | Beecham | |
| 2018/0331885 A1 | 11/2018 | Raymond | |
| 2018/0359256 A1 | 12/2018 | Luzader | |
| 2019/0026332 A1 | 1/2019 | Ahmed | |
| 2019/0044925 A1 | 2/2019 | Hawkins | |
| 2019/0068406 A1 | 2/2019 | Eperiesi-Beck | |
| 2019/0068706 A1 | 2/2019 | Chen | |
| 2019/0102437 A1 | 4/2019 | Patthak | |
| 2019/0121959 A1 | 4/2019 | Woodworth, Jr. | |
| 2019/0180053 A1 | 6/2019 | Angara | |
| 2019/0190890 A1 | 6/2019 | Druker | |
| 2019/0207754 A1 | 7/2019 | Iyer | |
| 2019/0236284 A1 | 8/2019 | Hersans | |
| 2019/0238559 A1 | 8/2019 | Paradis | |
| 2019/0261169 A1 | 8/2019 | Ashfaq | |
| 2019/0273746 A1* | 9/2019 | Coffing | H04L 67/32 |
| 2019/0287672 A1 | 9/2019 | Molina | |
| 2019/0334779 A1 | 10/2019 | Woodward | |
| 2019/0342088 A1 | 11/2019 | Eidson | |
| 2019/0349360 A1 | 11/2019 | Yeddula | |
| 2019/0356693 A1 | 11/2019 | Cahana | |
| 2019/0385159 A1 | 12/2019 | Beatty | |
| 2020/0012817 A1 | 1/2020 | Damick | |
| 2020/0082121 A1 | 3/2020 | Hanafee | |
| 2020/0084219 A1 | 3/2020 | Sung | |
| 2020/0089680 A1 | 3/2020 | Mital | |
| 2020/0089912 A1 | 3/2020 | Mital | |
| 2020/0092288 A1 | 3/2020 | Mital | |
| 2020/0092289 A1 | 3/2020 | Mital | |
| 2020/0092314 A1 | 3/2020 | Mital | |
| 2020/0120120 A1 | 4/2020 | Cybulski | |
| 2020/0160388 A1 | 5/2020 | Sabeg | |
| 2020/0186534 A1 | 6/2020 | Chanda | |
| 2020/0205114 A1 | 6/2020 | Elcock | |
| 2020/0226576 A1 | 7/2020 | Mcmahon | |
| 2020/0334376 A1 | 10/2020 | Bragdon | |
| 2020/0336551 A1 | 10/2020 | Knox | |
| 2021/0004373 A1 | 1/2021 | Sankaran | |
| 2021/0042262 A1 | 2/2021 | Nair | |
| 2021/0134406 A1 | 5/2021 | Manuel | |
| 2021/0211468 A1 | 7/2021 | Griffin | |
| 2021/0409487 A1 | 12/2021 | Pi | |

OTHER PUBLICATIONS

Martin et al., Finding Application Errors and Security Flaws Using PQL: A Program Query Language, OOPSLA '05, Oct. 16-20, 2005, pp. 365-383.

Citrix Systems Inc: 'NetCaler 12.0 Release Notes Documentation—AppFlow', May 29, 2015, pp. 1503-1519, Retrieved from the Internet: URL: https://docs.citrix.com/en-us/netscaler/downloads/citrix-netscaler-12-0.pdf [retrieved on Feb. 5, 2020].

Citrix Systems Inc: 'NetScaler 12.0 Release Notes Documentation—Application Switching and Traffic Management Features', Aug. 26, 2016, pp. 99-105, Retrieved from the Internet: URL: https://docs.citrix.com/en-us/netscaler/downloads/citrix-netscaler-12-0.pdf [retrieved on Feb. 5, 2020].

(56) References Cited

OTHER PUBLICATIONS

Citrix Syste,s Inc: 'NetScaler 12.0 Released Notes Documentation—Getting Started with Citrix NetScaler', Jul. 5, 2017, pp. 14-25, Retrieved from the Internet: URL: https://docs.citrix.com/en-us/netscaler/downloads/citrix-netscaler-12.0.pdf [retrieved on Feb. 5, 2020].
Citrix Systems Inc: 'NetScaler 12.0 Release Notes Documentation—How AAA Works', Oct. 21, 2015, pp. 805-807, Retrieved from the Internet: URL: https://docs.citrix.com/en-us/netscaler/downloads/citrix-netscaler-12-0.pdf [retrieved on Feb. 5, 2020].
Rath et al., "Adaptive Risk-Aware Access Control Model for Internet of Things," 2017 International Workshop on Secure Internet of Things (SIoT) Year: 20171 Conference Paper | Publisher: IEEE.
Zhang et al., "Webshell Traffic Detection With Character-Level Features Based on Deep Learning," IEEE Access Year: 2018 | vol. 6 | Journal Article | Publisher: IEEE.

\* cited by examiner

SIDECAR ARCHITECTURE FOR STATELESS PROXYING TO DATABASES

CROSS REFERENCE TO OTHER APPLICATIONS

This application claims priority to U.S. Provisional Patent Application No. 62/891,795 entitled ARCHITECTURE HAVING A PROTECTIVE LAYER AT THE DATA SOURCE UTILIZING MICRO PROXIES, A CENTRAL AUTHORIZATION SERVICE AND ACTIVITY MONITORING filed Aug. 26, 2019 which is incorporated herein by reference for all purposes.

This application is a continuation in part of co-pending U.S. patent application Ser. No. 16/548,732 entitled ARCHITECTURE HAVING A PROTECTIVE LAYER AT THE DATA SOURCE filed Aug. 22, 2019, which claims priority to U.S. Provisional Patent Application No. 62/733,013 entitled ARCHITECTURE HAVING A PROTECTIVE LAYER AT THE DATA SOURCE, BEHAVIORAL BASELINING FROM DATA SOURCE PERSPECTIVE AND TOKENIZATION SUCH THAT ONLY AUTHORIZED APPLICATIONS CAN USE TOKENS filed Sep. 18, 2018, U.S. Provisional Patent Application No. 62/758,223 entitled ARCHITECTURE HAVING A DATA SOURCE SIDECAR AND APP AGENT filed Nov. 9, 2018, and U.S. Provisional Patent Application No. 62/840,847 entitled ARCHITECTURE HAVING A PROTECTIVE LAYER AT THE DATA SOURCE AND THAT PROVIDES QUERY ANALYSIS, FEDERATED IDENTITY MANAGEMENT AND MULTI-FACTOR AUTHENTICATION filed Apr. 30, 2019, all of which are incorporated herein by reference for all purposes.

BACKGROUND OF THE INVENTION

Conventional security models protect data and electronic assets by providing a secure perimeter around an organization. The secure perimeter includes not only the data sources, servers, and other analogous assets, but also clients employed by users of the assets. However, applications remain vulnerable, unscrupulous individuals may still obtain copies of sensitive data and administration of the secure perimeter may be complex and expensive. Accordingly, an improved mechanism for managing access to data sources is desired.

BRIEF DESCRIPTION OF THE DRAWINGS

Various embodiments of the invention are disclosed in the following detailed description and the accompanying drawings.

DETAILED DESCRIPTION

Figure 1:
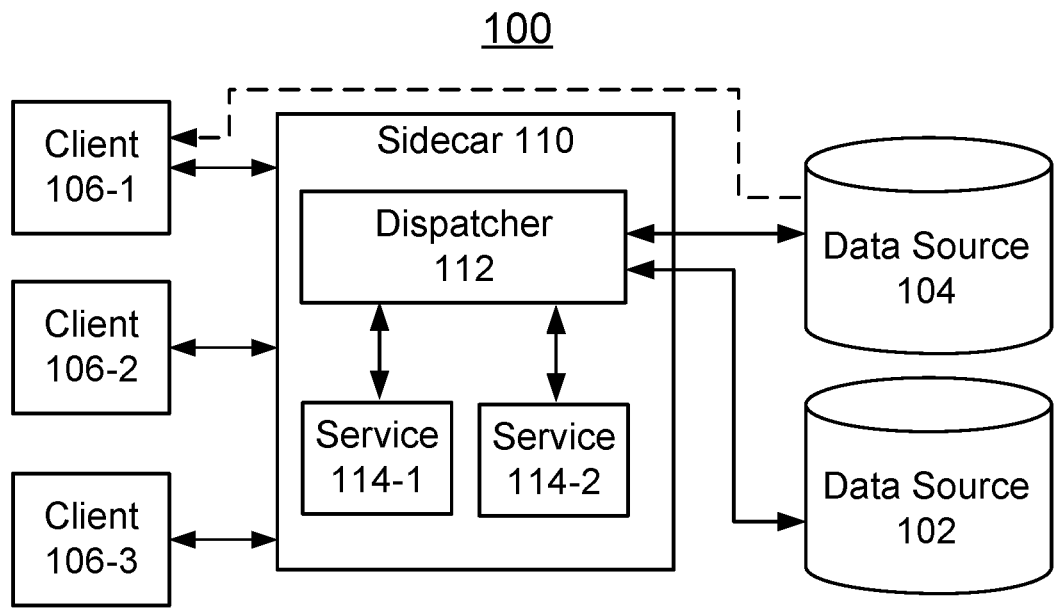
FIG. 1 is an exemplary embodiment of a system including a protective layer at the data source.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The systems and methods described herein provide a protection layer, or sidecar, that resides at and functions as a secure perimeter around a data source. Clients (e.g. applications and/or end users) communicate with and are validated by the sidecar to access the data source. Compromised applications (including previously validated applications) may be denied access to the data source. This approach is in contrast to security measures that place a perimeter around the entire organization including the data source and applications. The methods and systems may also track an application's accesses of the data source to determine a context/behavioral baseline for the application. For example, the type of session, browser, APIs, IP address, query attributes etc. may be used to determine a behavioral baseline for accesses of the data source. Subsequent accesses are compared to the baseline to determine whether a current query matches the baseline. If not, additional validation/defense mechanisms may be employed. Application identity, or application fingerprinting, may be incorporated into this behavioral baselining. In some aspects, data masking may also be employed. In data masking, sensitive data are replaced by tokens or format preserving encryption having a similar form but without intrinsic meaning. For example, credit card or social security numbers may be replaced by a different number having the same number of digits. Tokens may also have an expiration time, requestor identification and other data used to track tokens' use. Tokens are used unless/until the sensitive data are needed (e.g. credit card number needed to process a transaction). If the sensitive data are needed, tokens are presented to the data vault and validated to obtain the sensitive data.

In some embodiments, a sidecar functions as a secure perimeter around a data source. The sidecar includes a dispatcher and a number of services that communicate with the dispatcher. The dispatcher may be a Layer 4 component that intercepts accesses of the data source. Both incoming accesses and outgoing data may be intercepted by the dispatcher. The dispatcher is data agnostic so can be deployed across a variety of data sources. The dispatcher may hold packets (step mode) or immediately forward packets to/from the data source (stream mode) but does not inspect the packets. The dispatcher also provides packets to the services. The services perform deeper inspection of the packets intercepted by the dispatcher. Services may provide one or more functions including but not limited to: authentication of the user/requester of the data source, query analysis, multifactor authentication, tokenization of data, rewriting, caching and behavioral baselining (using collectors), federated identity management and other functionality. In some embodiments, services may include Layer 7 (application layer) components. For example, for authentication, the service may inspect the user's credentials (e.g. user id and password and/or certificate) for that data source and only allow access to the data source if the user's credentials are validated. One or more of these services can be used together. This approach is in contrast to security measures that place a perimeter around the entire organization including the data source and applications or which attempt to manage the data source/organization using Layer 7 components.

In addition to the sidecar at the data source, collectors may be used at some/all of the clients using the data repository/data source. Collectors can be present for some or all clients having applications issuing queries to the data source. For example, collectors can be attached to applications for end users as well as in microservices utilized by end users. A collector intercepts a communication (e.g. a query or method call) from the application and examines the state of the application. For example, the type of session, get/put/post/delete commands, APIs, IP address, query attributes, method calls, order of queries and/or other information may be detected by the collector. These represent the context of the query, or state of the application/client issuing the query. The collectors attach this context to the query. In the case of microservices/multiple applications pass a query before the query is sent to a database. For example, one microservice may issue a query and pass the query to a second microservice. The second microservice may add to the query or issue an additional query. The collector for each microservice/application can obtain the context from that microservice/application. The collector also attaches the context from that microservice/application to the query/queries. Thus, multiple contexts may be obtained from multiple microservices/applications for a single access of a data source. The query and context are passed to the sidecar when the data source is accessed. Over multiple accesses, the context can be used by the sidecar (e.g. a service) to determine the behavior (sequence of states/contexts) for each application's accesses of the data source. A model of the behavior (e.g. a Hidden Markov Model) can provide a behavioral baseline. Subsequent accesses are compared to the behavioral baseline to determine whether a current query matches the behavioral baseline. If not, additional validation/defense mechanisms may be employed. For example, access to the data source can be refused and/or multifactor authentication invoked. Collectors and/or behavioral baselining may be used in conjunction with other services.

Requests regarding sensitive data can be sent to a tokenization/encryption service by the dispatcher. The service replaces sensitive data with tokens/format preserving encryption (FPE), or analogous data that is without intrinsic meaning. What is used (tokens or FPE) is configurable on the attribute level. For example, for credit card numbers of a user, FPE can be used. For the social security number of the same user, a token can be used. In some embodiments, the request to store sensitive information can be provided to the service and the value encrypted before storage in the data store. A request to obtain the number can be provided to the service which can decrypt/detokenize if the requester is authorized. Alternatively, the token/FPE can be provided in response to the request. Tokens/FPE can have an expiration time, requestor identification or other information. Tokens are used unless/until the sensitive data are needed (such as a credit card number needed to process a transaction). If the sensitive data are needed, tokens are presented to the data vault and validated to obtain the sensitive data. This validation may require additional, more trusted mechanisms for ensuring the security of the sensitive data. Tokenization can be used in conjunction with behavioral baseline/collectors, multifactor authentication and/or other services.

Multifactor authentication may also be performed using a service. In some embodiments, the dispatcher is placed in step mode, to hold packets instead of directly forwarding to a data source. The dispatcher also provides packets to the service, which controls multi-factor authentication. The service performs multifactor authentication (e.g. requiring a code to be sent to a separate device and input) or accesses a third party multifactor authentication service. Once multifactor authentication is completed, the dispatcher is placed in stream mode, allowing the user to communicate with the data source. Thus, the data agnostic dispatcher can provide multifactor authentication across a number of different data sources, such as databases that do not traditionally support multifactor authentication.

The dispatcher can forward requests/queries to an analyzer service that performs query analysis. The analyzer service examines/parses the queries and emits a structure that describes the query. In some embodiments, the structure is an abstract syntax tree. However, other structures may be used. The structure can be used to determine whether the query represents an attack, (e.g. to obtain unauthorized information) to determine whether the query will adversely affect performance. For example, queries which include wildcards or tautologies in users' names can result in exfiltration of sensitive information. Queries that are missing a where clause can adversely affects database performance. Such queries may be identified. The packet including the query can then be stopped or the query can be canceled. Further, the structure emitted by the query analyzer may be used to log or otherwise store information about the queries. For example, the structure may be used to identify and log features of the query that may be of interest. Such information may be used in conjunction with analytics to examine use of the data source. In some embodiments, the information regarding queries that is logged can be indexed and may include only information previously identified as sensitive. For example, the tables, columns in tables, and data entries corresponding to the identified sensitive information may be logged. Further, such information redacted so that certain information, such as names and/or social security numbers, are not included in the log.

Another service provided may include query rewriting, which may be used with query analysis. Queries that may adversely affect performance can be rewritten. For example, a limit may be added so that too many results are not returned, a tautology removed, and/or other portions of the query rewritten to improve performance.

A service can be used for federated identity management (for example via lightweight directory access protocol (LDAP)). An end user requests access to the data repository/database and provides the directory access credentials via the sidecar. The dispatcher provides the request to a service controlling federated identity management. The sidecar/service determines whether the end user exists on a directory access server (e.g. an LDAP server), authenticates the end user's credentials on the directory access server and determines the groups to which the end user belongs. The service uses the group information to access the data repository as a proxy for the end user.

A method and system for performing at least one service are disclosed. The method and system include receiving a communication for a data source at a sidecar. The sidecar includes a dispatcher and at least one service. The dispatcher receives the communication and is data agnostic. The method and system also include providing the communication from the dispatcher to the data source and to the at least one service. The at least one service inspects the communication and may perform additional functions. In some embodiments, the dispatcher is an open systems interconnection (OSI) Layer 4 dispatcher and the service(s) include OSI Layer 7 service(s). In some embodiments, the method and system also include performing at least one function by the at least one service based on the communication. The at least one function may include one or more of authentication services, multifactor authentication, tokenization of data, encryption of data, query analysis, behavioral baselining, and federated identity management. For example, the communication may be generated at a client and service(s) may include an authentication service. In such embodiments, the method and system further include determining whether the client is authorized to access the data source using the authentication service and preventing access to the data source if the client is not authorized to access the data source. For example, the communication may be provided to the data source only if the authentication service determines the client is authorized to access the data source. In some embodiments, the communication to the data source from the dispatcher and recalled before processing by the data source if the authentication service determines the client is not authorized to access the data source. In some embodiments, the communication is generated at a client and includes a first communication. The service(s) include an authentication service the dispatcher is in a step mode for the first communication from the client. In such embodiments the first communication may be provided to the authentication service without forwarding the first communication to the data source (step mode). The authentication service may use the first communication to determine whether the client is authorized to access the data source. If it is determined that the client is not authorized to access the data source, access to the data source by the client may be prevented by terminating a connection to the client. If it is determined that the client is authorized, then the first communication is provided from the dispatcher to the data source. The dispatcher is also placed in a stream mode. Upon receiving additional communication(s) from the client, the dispatcher, automatically forwards the at least one additional communication from the dispatcher to the data source.

A method and system that may utilize behavioral baselining are disclosed. The method and system include receiving, at the sidecar, a communication and a context associated with the communication from a client. The communication is for a data source. The sidecar includes the dispatcher and the service. The method and system also include providing the context from the dispatcher to the service. In some embodiments, the method and system use the service to compare the context to a behavioral baseline for the client. The behavioral baseline incorporates a plurality of contexts previously received from the client. The method and system also permit the client access the data source only if the context is consistent with the behavioral baseline. The behavioral baseline may also be updated based on the context. In some embodiments, the communication is intercepted at the client using a collector. The collector determines the context of the client and attaches the context to the communication. In some embodiments, the method and system include receiving, at the dispatcher and from the client, additional communication(s) and additional context(s) associated with the additional communication(s). The additional communication(s) are for the data source. The additional context(s) are provided from the dispatcher to the service. The service compares the context and additional context(s) to the behavioral baseline for the client. In some embodiments, the client is allowed to access the data source only if the context and the additional context(s) are consistent with the behavioral baseline. In some embodiments, the method and system also include receiving additional context(s) associated with the communication from additional client(s). The additional context(s) are also provided from the dispatcher to the service. In such embodiments, the service compares the context and the additional context(s) to the behavioral baseline for the client.

A method and system for anonymizing data are disclosed. The method and system include receiving, at the sidecar, a request to store data in a data source. The method and system also include providing the request from the dispatcher to the at least one service and anonymizing, at the service(s), the data to provide anonymized data. The anonymized data may be provided to the data source. In some embodiments, the request includes the data and additional data. In such embodiments, the anonymizing further includes identifying the data to be anonymized. The anonymizing may include tokenizing and/or encrypting the data. The tokenizing and/or encrypting may be selected based upon a policy for the data. In some embodiments, the encryption uses format preserving encryption. In some embodiments, the method and system further include receiving, from a requester, an access request for the data. The requester is authenticated. If the requester is authorized to receive the data, the method and system include de-anonymizing the anonymized data and providing de-anonymized data to the requester. If the requester is authorized to receive the anonymized data, the method and system include providing the anonymized data.

A method and system for performing authentication are described. The method and system include receiving, from a client, a communication for a data source at the sidecar. The communication is provided from the dispatcher to the service. The service determines whether the client is authorized to access the data source. In some embodiments, the service determines whether the client is authorized by calling a multi-factor authentication (MFA) utility. The method and system also include receiving, from the MFA utility, a success indication. The success indication indicates whether authentication by the MFA utility is successful. In some embodiments, the MFA utility is a third-party MFA utility. The method and system may also include preventing access to the data source if the success indication indicates that the authentication is unsuccessful. Preventing access may include providing the communication to the data source from the dispatcher and recalling the communication before processing by the data source if the authentication indication indicates the authentication is unsuccessful. In some embodiments, the communication includes a first communication and the dispatcher is in a step mode for the first communication. In such embodiment, the preventing access may include providing the first communication to the service without forwarding the first communication to the data source. Preventing access to the data source may include terminating a connection to the client if the success indication indicates that the authentication is unsuccessful. In addition, the first communication may be forwarded from the dispatcher to the data source if the success indication indicates that the authentication is successful. The dispatcher may be placed in a stream mode if the success indication indicates that the authentication is successful. At least one additional communication from the client may be received at the dispatcher. Such additional communications are automatically forwarded from the dispatcher to the data source if the success indication indicates that the authentication is successful. In some embodiments, the dispatcher is an open systems interconnection (OSI) Layer 4 dispatcher and wherein the at least one service includes at least one OSI Layer 7 service.

A method and system for performing query analysis are described. The method and system include receiving a query for a data source at the sidecar. The method and system also include providing the query from the dispatcher to the data source and to the service. The query is analyzed using the service. In some embodiments, analyzing the query further includes parsing the query, providing a logical structure based on the query and analyzing the logical structure. In some embodiments, a log is provided based on the logical structure. The log may also be analyzed. The method and system may include receiving at least one of an identification of sensitive data and sensitive data policies. In some such embodiments, providing the log further includes redacting a portion of the log based on the sensitive data policies and the identification of the sensitive data. The method and system may prevent access to the data source if the analysis of the query indicates the query is an attack. In some embodiments, the method and system rewrite the query if the analysis of the query indicates the query adversely affects performance. In some embodiments, the analysis of the query indicates that data for a response to the query is in a cache. In such embodiments, the method and system may provide the data from the cache.

A method and system for performing federated identity management are described. The method and system include receiving a communication for a data source at a sidecar. The sidecar includes a dispatcher and a service. The dispatcher receives the communication and is data agnostic. The communication corresponds to end user credentials for an end user. The method and system include providing the communication from the dispatcher to the data source and to the service. The method and system also use the service to authenticate the end user based on the end user credentials and utilizing federated identity management. In some embodiments, the method and system also include accessing the data source by the sidecar as a proxy for the end user if the end user is authenticated using the federated identity management. The end user activities for the data source may also be logged. In some embodiments, authenticating the end user includes providing the end user credentials to a federated identity management data source. The federated identity management data source may be searched for group(s) to which the end user belongs. In some embodiments, a read only binding of the service to the federated identity management data source is performed. In such embodiments, the federated identity management data source may be searched for the end user using the read only binding. If the end user is authenticated, the method and system may include binding the service to the federated identity management data source as a proxy for the end user. Access to the data source may be prevented if the end user is not authenticated utilizing the federated identity management.

FIG. 1 is a diagram depicting an exemplary embodiment of a system 100 utilizing a protective layer between clients and data sources. System 100 includes data sources 102 and 104, clients 106-1, 106-2 and 106-3 (collectively clients 106) and sidecar 110. Although two data sources 102 and 104, three clients 106 and one sidecar 110 are shown, in another embodiment, different numbers of data sources, clients, and/or sidecars may be used. Data sources 102 and 104 may be databases, data stores, data vaults or other data repositories. Clients 106 may be computer systems for end users and/or include applications which provide requests, or queries, to data sources 102 and 104. Clients 106 may be part of the same organization as the data sources 102 and 104 or may be outside users of data sources 102 and 104. For example, clients 106 and data sources 102 and 104 may be part of the same business organization coupled by an internal network. In other embodiments, clients 106 may be outside users of data sources 102 and 104 connected to sidecar 110 and/or data sources 102 and/or 104 via the Internet or other external network. In some embodiments, some clients 106 may be external users of data sources 102 and 104 while other clients 106 are part of the same organization as data sources 102 and 104.

Sidecar 110 provides a protective layer between clients 106 and data sources 102 and 104. Sidecar 110 is configured such that its operation is data agnostic. Thus, sidecar 110 may be used with data sources 102 and 104 that have different platforms, are different databases, or are otherwise incompatible. Sidecar 110 is so termed because although depicted as residing between clients 106 and data sources 102 and 104, sidecar 110 may be viewed as enclosing, or forming a secure perimeter around data sources 102 and 104. Stated differently, clients 106 cannot bypass sidecar 110 in order to access data sources 102 and 104 in at least some embodiments. For example, a security group may be created for data sources 102 and 104. Dispatcher 112/sidecar 110 may be the only member of the security group. Thus, clients 106 may access data sources 102 and 104 only through sidecar 110. Clients 106 connecting to sidecar 110 may be internal or external to an organization. Therefore, sidecar 110 need not reside at the perimeter of an organization or network. Instead, sidecar 110 may reside at data sources 102 and 104. Stated differently, sidecar 110 may provide the final or only security for requests for data source 102 and 104 and need not provide security for other components of the organization. Thus, requests made by clients 106 may be passed directly from sidecar 110 to data sources 102 and 104 via a network.

Sidecar 110 provides security and other services for data sources 102 and 104 and clients 106. To do so, sidecar 110 includes dispatcher 112 and services 114-1 and 114-2 (collectively services 114). Dispatcher 112 is data agnostic and in some embodiments is a transport layer component (e.g. a component in Layer 4 of the Open Systems Interconnection (OSI) model). Dispatcher 112 thus performs limited functions and is not a Layer 7 (application layer) component. In particular, dispatcher 112 receives incoming communications from clients 106. As used herein, a communication includes a request, a query such as a SQL query, or other transmission from clients 106 to access data source 102 or 104.

Dispatcher 112 also provides the requests to the appropriate data source(s) 102 and/or 104 and the appropriate service(s) 114-1 and/or 114-2. However, dispatcher 112 does not inspect incoming communications from clients 106 other than to identify the appropriate data source(s) 102 and/or 104 and corresponding service(s) 114 for the communication. Dispatcher 112 does not make decisions as to whether communications are forwarded to a data source or service. For example, a communication from a client 106 may include a header indicating the data source 102 desired to be accessed and a packet including a query. In such a case, dispatcher 112 may inspect the header to identify the data source 102 desired to be accessed and forwards the packet to the appropriate data source 102. Dispatcher 112 also provides the packet to the appropriate service(s) 114. However, dispatcher 112 does not perform deep inspection of the packet. Instead, the appropriate service(s) inspect the packet. In some embodiments, dispatcher 112 provides the communication to the appropriate service(s) 114 by storing the packet and providing to service(s) 114 a pointer to the storage location.

In some embodiments, dispatcher 112 holds communications (e.g. packets) while service(s) 114 perform their functions. In other embodiments, dispatcher 112 directly forwards the communications to data source(s) 102 and/or 104 and services 114 separately perform their functions. In some embodiments, whether dispatcher 112 holds or forwards communications depends upon the mode in which dispatcher 112 operates. For example, in a step mode, dispatcher 112 may store some or all of the communication from client 106-1 without forwarding the communication to data sources 102 and 104. In such a mode, dispatcher 112 only forwards the communication to a data source if instructed to do so by the appropriate service 114 or if placed into stream mode by the appropriate service 114. Although not forwarding the communication to a data source, dispatcher 112 does provide the communication to service 114-1, for example for client 106-1 to be authenticated and/or for other functions. If client 106-1 is authenticated, dispatcher 112 may be placed in stream mode by service 114-1. Consequently, dispatcher 112 forwards the communication to the appropriate data source(s) 102. Because dispatcher 112 is now in stream mode, subsequent communications from client 106-1 may then be forwarded by dispatcher 112 directly to the appropriate data source(s) 102 and/or 104, even if the subsequent communications are also provided to a service 114 for other and/or additional functions. Thus, dispatcher 112 may provide the communication to the data source(s) as received/without waiting for a response from a service 114.

In some embodiments, responses from data source(s) 102 and/or 104 are also inspected by sidecar 110 and provided to clients 106 only if the responses are authorized. As used herein, a response from a data source may include data or other transmission from the data source to the client requesting access. In other embodiments, responses from data source(s) 102 and/or 104 may bypass sidecar 110 and be provided directly to clients 106. This is indicated by the dashed line from data source 104 to client 106-1. In the embodiment shown, therefore, data source 104 may bypass sidecar 110 and provide responses directly to client 106-1.

Services 114 provide security and other functions for data sources 102 and 104 and clients 106. For example, services 114 may include one or more of authentication, query analysis, query rewriting, caching, tokenization and/or encryption of data, caching, advanced or multifactor authentication, federated identity management, and/or other services. Further, one or more of the services described herein may be used together. Services 114 perform more functions than dispatcher 112 and may be application layer (Layer 7) components. In contrast to dispatcher 112, services 114 may perform a deeper inspection of communications from clients 106 in order to provide various functions. The services 114 performing their functions may thus be decoupled from forwarding of communications to data source(s) 102 and/or 104 by dispatcher 112. If a client or communication is determined by a service 114 to be unauthorized or otherwise invalid, the communication may be recalled, or canceled, from data source(s) 102 and/or 104 and connection to the client terminated. The communication may be recalled despite the decoupling of tasks performed by services 114 with forwarding of communications by dispatcher 112 because data sources 102 and 104 typically take significantly more time to perform tasks than services 114. The time taken by data source 102 and 104 may be due to issues such as transmission over a network from sidecar 110 to data sources 102 and 104, queues at data sources 102 and 104, and/or other delays.

In some embodiments, services 114 may perform authentication. For example, suppose service 114-1 validates credentials of clients 106 for data sources 102 and 104. In some such embodiments, service 114-1 may simply employ a username and password combination. In other embodiments, multifactor authentication (MFA), certificates and/or other higher level authorization is provided by one or more services 114. Such authentication is described herein. However, dispatcher 112 may still be a data agnostic component, such as a Layer 4 component.

In some embodiments, this separation of functions performed by dispatcher 112 and services 114 may be facilitated by routines or other lightweight process(es). For example, a client such as client 106-2 may request access to data source 104 via a particular port. Sidecar 110 may utilize listener(s) (not shown in FIG. 1) on the ports to identify requests for data sources 102 and 104. In response to the request for access, a connection to the client 106-2 is established for the sidecar 110 on that port and a routine corresponding to the connection generated. In some embodiments, the routine is responsible for that connection only. The communication from client 106-2 is also provided to dispatcher 112. Dispatcher 112 provides the communication to the appropriate service(s) 114 for authentication, for example via a message bus (not shown in FIG. 1). Dispatcher 112 may hold (in step mode) or forward (in stream mode) the communication to the data source(s) 102 and/or 104. If client 106-2 is not authenticated or is later determined by service(s) 114 to be unauthorized, then the service(s) 114 indicates this to dispatcher 112. For example, service(s) 114 may provide a message to dispatcher 112 via the message bus that client 106-2 is not authorized/that the corresponding routine has an unauthorized connection. Dispatcher 112 communicates with the corresponding routine, which terminates the connection to client 106-2. Thus, connections to clients 106 may be securely managed using data agnostic, Layer 4 dispatcher 112.

Using system 100 and sidecar 110, data sources 102 and 104 may be secured and other features may be provided via service(s) 114. Because of the use of data agnostic dispatcher 112, sidecar 110 may function with a variety of data sources 102 and 104 that do not share a platform or are otherwise incompatible. Deployment of sidecar 110, for example either in the cloud or on premises, does not require changes in existing code. Consequently, implementation of sidecar 110 may be seamless and relatively easy for developers. Further, sidecar 110 need not protect every component within a particular organization. Instead, only selected data sources may be protected. Use of services 114 for security as described herein may be both more effective at securing sensitive data and less expensive because data sources may not significantly increase in number even when the number of applications that access the data sources grows significantly. Further, utilizing services 114, the level of security and/or functions provided by sidecar 110 may differ for different data sources. Additional functionality may also be provided by services 114.

Figure 2:
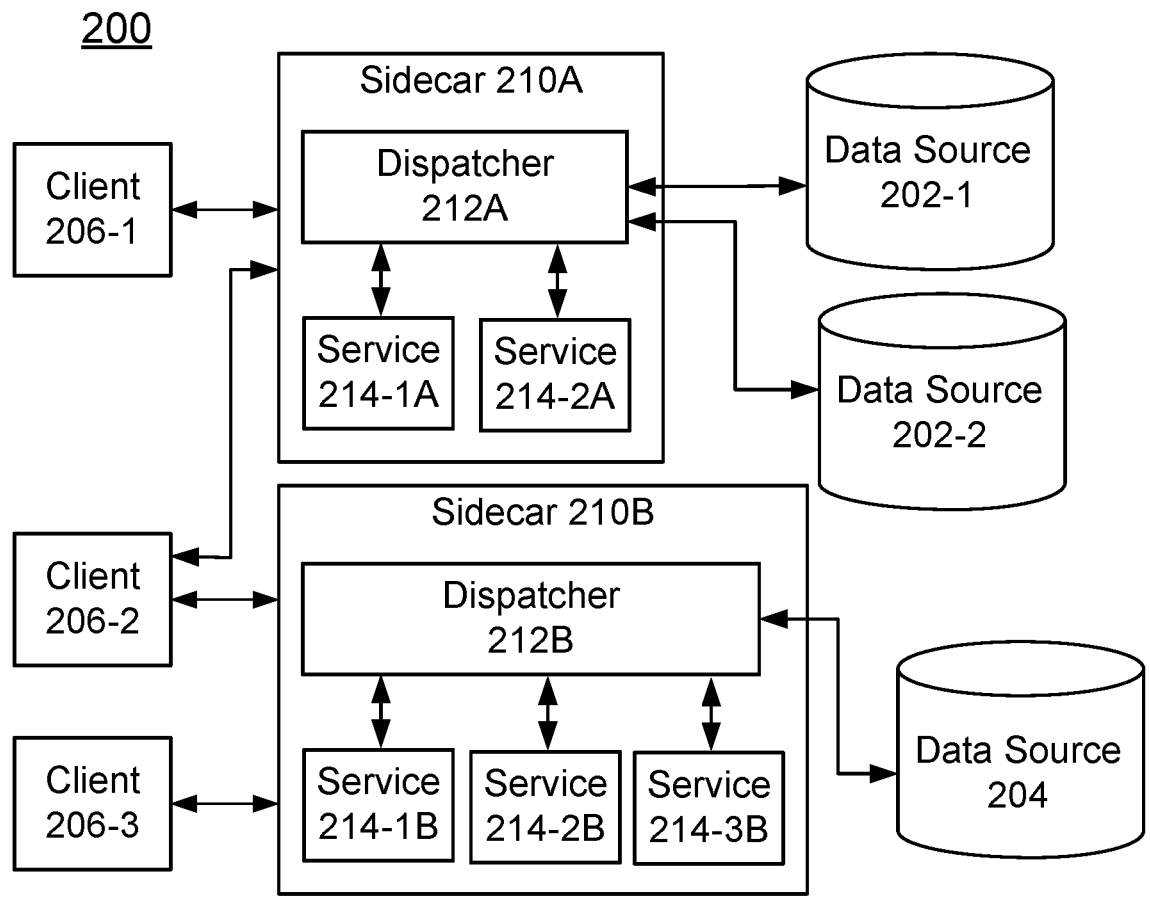
FIG. 2 is another exemplary embodiment of a system including a protective layer at the data source.

FIG. 2 is a diagram depicting another exemplary embodiment of a system 200 utilizing a protective layer between clients and data sources. System 200 is analogous to system 100 and includes components that are labeled similarly. System 200 indicates that multiple sidecars having different services may be used. Thus, system 200 includes data sources 202-1, 202-2 (collectively 202) and 204, clients 206-1, 206-2 and 206-3 (collectively clients 206) and sidecars 210A and 210B (collectively sidecars 210). Although three data sources 202-1, 202-2 and 204, three clients 206 and two sidecars 210 are shown, in another embodiment, different numbers of data sources, clients, and/or sidecars may be used. Data sources 202-1, 202-2 and 204 and clients 206 are analogous to data sources 102 and 104 and clients 106, respectively. Sidecars 210A and 210B are analogous to sidecar 110. Thus, sidecar 210A includes dispatcher 212A and services 214-1A and 214-2A (collectively services 214A). Similarly, sidecar 210B includes dispatcher 212B and services 214-1B, 214-2B and 214-3B (collectively services 214). Services 214A may differ from or be included in services 214B. Sidecar 210A controls accesses to data sources 202, while sidecar 210B controls accesses to data source 204 in a manner analogous to described elsewhere herein. In general, one sidecar having multiple services may function for all the data sources in an organization. However, as depicted in FIG. 2, nothing prevents the use of multiple sidecars. Further, although sidecars 210A and 210B are shown as controlling access to different data sources 202 and 204, in other embodiments, sidecars may control the same data source. For example, in another embodiment, sidecar 210B might serve both data source 202-1 and data source 204.

Figure 3:
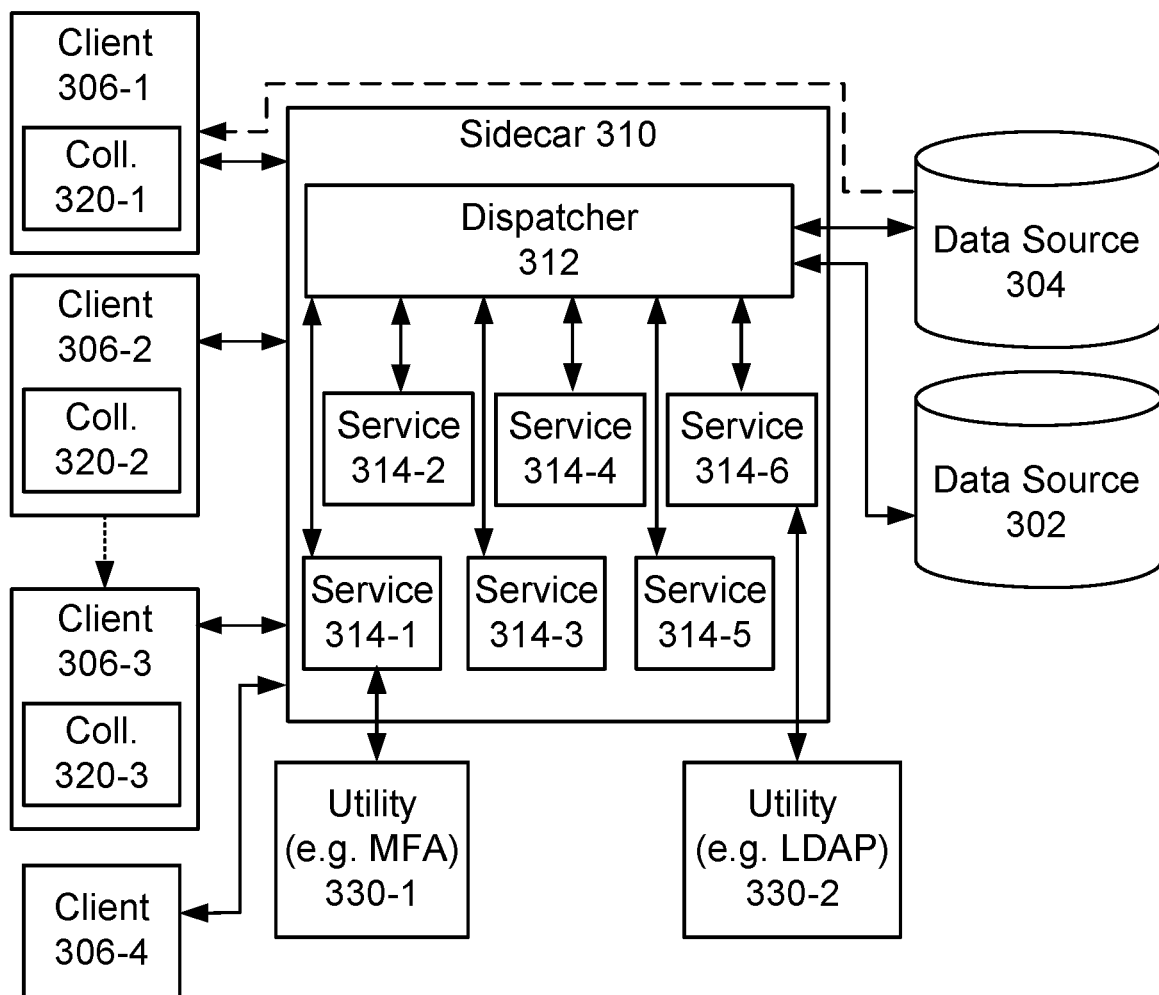
FIG. 3 is another exemplary embodiment of a system including a protective layer at the data source.

FIG. 3 is a diagram depicting another exemplary embodiment of a system 300 utilizing a protective layer between clients and data sources. System 300 is analogous to systems 100 and 200 and includes components that are labeled similarly. System 300 also includes collector 320-1, 320-2 and 320-3 (collectively collectors 320). Thus, system 300 includes data sources 302 and 304, clients 306-1, 306-2 and 306-3 (collectively clients 306) as well as client 306-4 and sidecar 310. Although two data sources 302 and 304, four clients 306 and one sidecar 310 are shown, in another embodiment, different numbers of data sources, clients, and/or sidecars may be used. Data sources 302 and 304 and clients 306 are analogous to data sources 102 and 104 and clients 106, respectively. Sidecar 310 is analogous to sidecar 110. Thus, sidecar 310 includes dispatcher 212 and services 314-1, 314-2, 314-3, 314-4 and 314-5 (collectively services 314). Sidecar 310 controls accesses to data sources 302 and 304. Also shown are utilities 330-1 and 330-2 that might be used by services 314. For example, service 314-1 might perform authentication and multifactor authentication using utility 330-1. Service 314-6 may perform federated identity management using utility 330-2. Other and/or additional utilities may be used in connection with system 300, as well as with system(s) 100 and/or 200. Service 314-2 might perform query analysis as described herein. Service 314-3 might perform behavior modeling based on inputs from collectors 320. Service 314-4 may perform tokenization and/or encryption of sensitive data. Service 314-5 may rewrite queries based on the analysis performed by service 314-2. Alternatively, service 314-2 might also rewrite queries. Thus, service 314-5 might perform another function such as caching. Other services not described herein may also be provided. Two or more services may be used together in some embodiments Collectors 320 reside on some clients 306. In some embodiments, each of the clients 306 includes a collector. In other embodiments, as shown in FIG. 3, not all clients 306 include a collector. In some embodiments, none of clients 306 includes a collector. For example, clients 306 may include end users, applications, and/or microservices utilized by end users. Thus, clients 306 may pass communications to each other prior to the communication being provided to sidecar 310. This is indicated by dotted line between client 306-2 and client 306-3. Collectors 320 intercept communications from clients 306 and append onto the communication a state of the client/application issuing the communication. For example, collector 320-1 may intercept a query or method call from the application on client 306-1 and examine the state of the application. The type of session, get/put/post/delete commands, APIs, IP address, query attributes, method calls, order of queries etc. may be detected by collector 306-1. These represent the context of the query/communication. Collectors 320 attach this context to the query/communication from the corresponding clients 306. In the case of microservices/multiple applications passing a query before the query is sent to a data source, the collectors 320 for each of the microservice/applications 306 may apply the context from that microservice/application. For example, a query passed from client 306-2 to client 306-3 and then to sidecar can include a first context provided by collector 320-2 and a second context provided by collector 320-3. If one or more of clients 306 being passed a query does not include a collector, then that client simply does not attach the context from the client. For example, if a query is passed from client 306-1 to client 306-4, then to client 306-3, a first context from collector 320-1 and a second context from collector 320-3 are attached to the query. In such embodiments, no context is attached by client 306-4 because no collector is present for client 306-4. The query and context(s) are passed to sidecar 310 when data source 302 or 304 is accessed. Over multiple accesses, the contexts can be used by sidecar 310 (e.g. a service such as service 314-3) to determine the behavior (sequence of states/contexts) for each application's accesses of data source(s) 302 and/or 304. A model of the behavior (e.g. using a Hidden Markov Model) can provide a behavioral baseline. Subsequent accesses are compared to the baseline by service 314-3 to determine whether a current query/communication matches the baseline. If not, additional validation/defense mechanisms may be employed. For example, the connection may be terminated as described herein, access to data source 302 and/or 304 may be otherwise denied and/or additional forms of validation such as MFA may be utilized via services 314.

System 300 may provide the benefits of systems 100 and/or 200. In addition, system 300 may improve security via collectors 320. Further, end-to-end visibility, from clients 306 to data sources 302 and 304, may be provided via sidecar 310. Thus, performance of system 300 may be improved.

Figure 4:
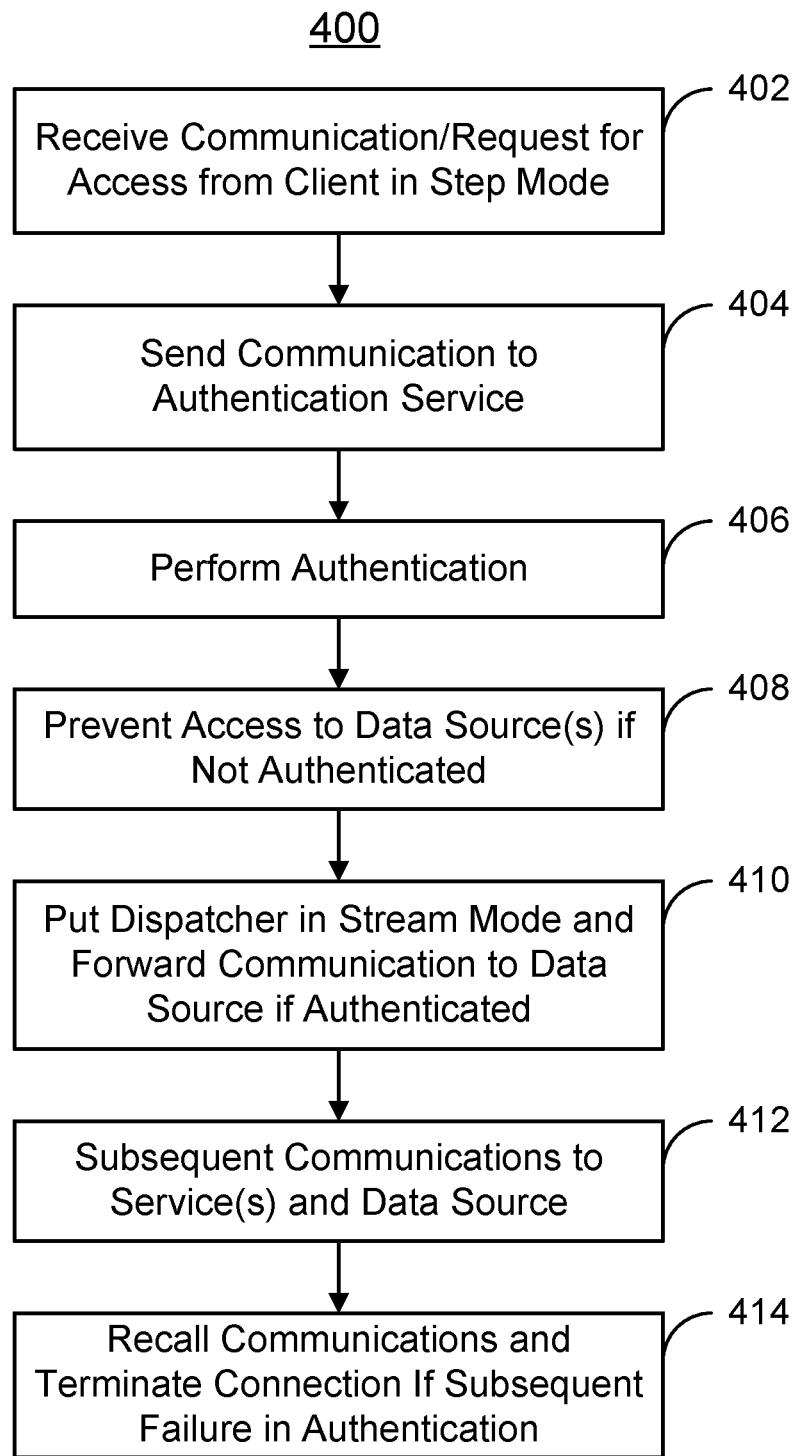
FIG. 4 is a flow chart depicting an exemplary embodiment of a method for authenticating a client for a data source.

FIG. 4 is a flow chart depicting an exemplary embodiment of method 400 for authenticating a client for a data source. Method 400 is described in the context of system 100. However, method 400 may be used in connection with other systems including but not limited to systems 200 and 300. For simplicity, certain steps of method 400 are depicted. Method 400 may include other and/or additional steps and substeps. Further, the steps of method 400 may be performed in another order including performing portions or all of some steps in parallel. Method 400 may be carried out each time a client commences a session for communication with a data source.

Dispatcher 112 of sidecar 110 receives a communication requesting access to one or more data sources from a client, at 402. For example, dispatcher 112 may receive a communication requesting access to data source 102 from client 106-1. The communication may be received at dispatcher 112 after a connection between sidecar 110 and client 106-1 is established and a corresponding routine or other corresponding lightweight process generated. In addition to identifying data source 102 and client 106-1, the request may also include credentials for client 106-1. In some embodiments, at the start of method 400, dispatcher 112 is in step mode. At 404, therefore, dispatcher 112 provides the communication from client 106-1 to service 114-1, which performs authentication. For example, dispatcher 112 may send the payload of the communication to service 114-1 via a message bus (not separately labeled in FIG. 1). However, because dispatcher 112 is in step mode, dispatcher 112 does not also forward the communication to the requested data source 102. Further, because dispatcher 112 is a data agnostic component such as a Layer 4 component, dispatcher 112 does not perform a deeper inspection of the communication. Instead, dispatcher 112 simply holds (e.g. stores) the communication because dispatcher 112 is in step mode. If dispatcher 112 were in stream mode, dispatcher 112 would also forward the packet to the appropriate data source 102.

Service 114-1 performs authentication of client 106-1, at 406. In some embodiments, a certificate and/or other credentials such as a username and password may be used to perform authentication. In some embodiments, MFA (described in further detail below) may be used. In addition, if collectors such as collectors 320 are present in the system, the context of the communication provided by client 106-1 may be used in authentication at 406. For example, the context appended to the communication by a collector 320 may be compared to a behavior baseline modeled by system 100 from previous communications by client 106-1 to determine whether the context sufficiently matches previous behavior. Other and/or additional authentication mechanisms may be used in some embodiments.

If the client requesting access is not authenticated, then access to the data source is prevented, at 408. For example, the routine corresponding to the connection with client 106-1 may be notified and the connection terminated. Other mechanisms for preventing access may also be used. The communication held by dispatcher 112 is also discarded. In other embodiments, if dispatcher 112 had forwarded the communication to data source 102, then the communication is recalled at 408.

If the client is authenticated, then at 410, dispatcher 112 is placed in stream mode at 410. As a result, the communication being held is forwarded to the selected data source 102 at 410. In addition, future communications corresponding to the authenticated connection with client 106-1 are forwarded to the selected data source 102 and appropriate service(s) 114, at 412. For example, service 114-1 may provide a message to dispatcher 112 changing dispatcher 112 from step mode to stream mode at 410. Consequently, dispatcher 112 also forwards the communication to corresponding data source 102. Future communications received at dispatcher 112 from client 106-1 via the same connection may be both provided to one of the services 114 and to the selected data source 102. Thus, clients 106 are allowed to request and receive data from data source 102. However, authentication may still continue. For example, behavioral baselining described herein, periodic requests to revalidate credentials or other mechanisms may be used, at 414. If client 106-1 loses its authentication, then communications from the client to the selected data source may be recalled and further access to the data source blocked, at 414. For example, the routine responsible for the connection to client 106-1 may be notified and the connection terminated. Thus, connection to clients 106 may be securely managed using dispatcher 112 that is a data agnostic component, such as a Layer 4 component.

Using method 400, data sources 102 and 104 may be secured. Because of the use of data agnostic dispatcher 112, sidecar 110 may function with a variety of data sources 102 and 104 that do not share a platform or are otherwise incompatible. Deployment of sidecar 110, for example either in the cloud or on premises, may require no change in existing code. Consequently, implementation of sidecar 110 may be seamless and relatively easy for developers. Further, sidecar 110 need not protect every component within a particular organization. Instead, only selected data sources may be protected. Use of services 114 for security as described herein may be both more effective at securing sensitive data and less expensive because data sources may not significantly increase in number even when the number of applications that access the data sources grows significantly. Further, utilizing services 114, the level of security and/or functions provided by sidecar 110 may differ for different data sources.

Figure 5:
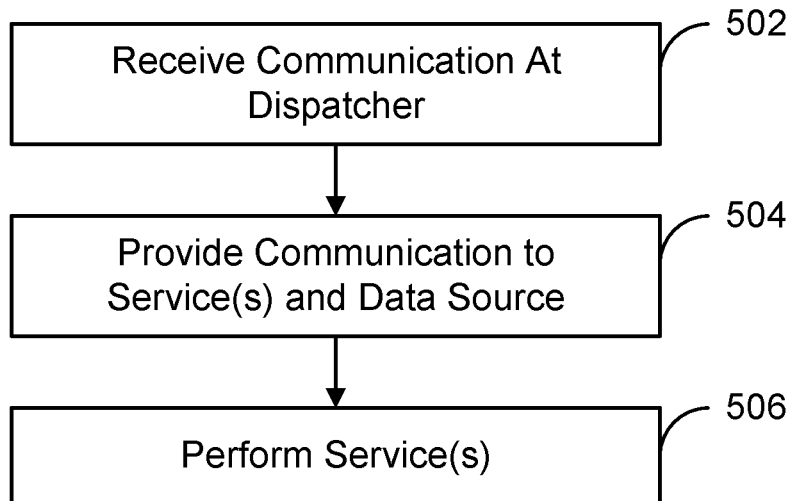
FIG. 5 is a flow chart depicting an exemplary embodiment of a method for performing services for a client for a data source.

FIG. 5 is a flow chart depicting an exemplary embodiment of method 500 for performing one or more services for a client and a data source. Method 500 is described in the context of system 100. However, method 500 may be used in connection with other systems including but not limited to systems 200 and 300. For simplicity, certain steps of method 500 are depicted. Method 500 may include other and/or additional steps and substeps. Further, the steps of method 500 may be performed in another order including performing portions or all of some steps in parallel. In some embodiments, method 500 may be considered to be operable once authentication of the client is completed and dispatcher 112 is in stream mode.

Dispatcher 112 of sidecar 110 receives a communication from a client, at 502. For example, dispatcher 112 may receive a communication from client 106-2 with a query for data source 104. One or more services 114 are desired to be used with the communication. Therefore, dispatcher 112 provides the communication from client 106-2 to service(s) 114, at 504. In addition, dispatcher 112 forwards the communication to the requested data source 104 at 504. Stated differently, dispatcher 112 provides the relevant portions of the communication to both the desired data source(s) and service(s). Because dispatcher 112 is a data agnostic component such as a Layer 4 component, dispatcher 112 does not perform a deeper inspection of the communication. Instead, dispatcher 112 simply forwards the communication both to the desired data source(s) 102 and/or 104 and to service(s) 114 for further processing.

The desired functions are provided using one or more of the services 114, at 506. This may include inspecting the communication as well as completing other tasks. For example, at 506, services 114 may be used for authentication of various types, query analysis, federated identity management, behavioral modeling, query rewriting, caching, tokenization or encryption of sensitive data and/or other processes. Services 114 may thus be Layer 7 components. However, tasks performed by services 114 are decoupled from forwarding of the communication to data sources by dispatcher 112.

Using system method 500 and sidecar 110, data sources 102 and 104 may be secured and other features may be provided via service(s) 114. Because of the use of data agnostic dispatcher 112, sidecar 110 may function with a variety of data sources 102 and 104 that do not share a platform or are otherwise incompatible. Functions performed by services 114 are decoupled from forwarding of communications to the data sources by dispatcher 112. Thus, a variety of features may be provided for data sources 102 and 104 without adversely affecting performance of data sources 102 and 104. Consequently, performance of system 100 may be improved.

Figure 6:
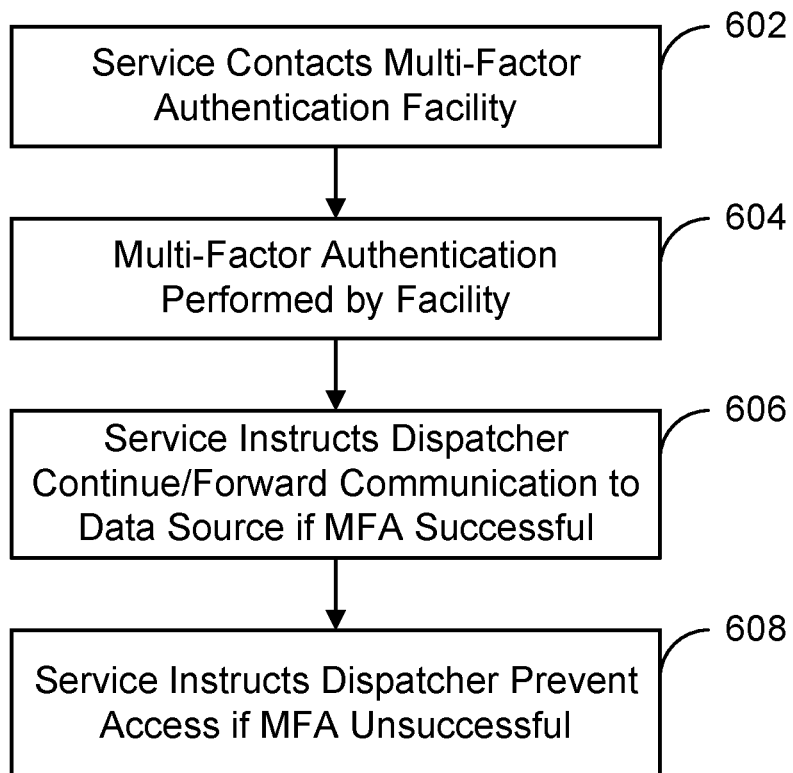
FIG. 6 is a flow chart depicting an exemplary embodiment of a method for performing multi-factor authentication for a client for a data source.

FIG. 6 is a flow chart depicting an exemplary embodiment of method 600 for performing multifactor authentication (MFA) for a client and a data source. Method 600 is described in the context of system 300. However, method 600 may be used in connection with other systems including but not limited to systems 100 and 200. For simplicity, certain steps of method 600 are depicted. Method 600 may include other and/or additional steps and substeps. Further, the steps of method 600 may be performed in another order including performing portions or all of some steps in parallel. In some embodiments, method 600 may be considered to be used in implementing 406 and/or 506 of method 400 and/or 500. For the purposes of explanation, suppose service 314-1 provides multi-factor authentication. Method 600 may be considered to start after the MFA service 314-1 receives the communication from dispatcher 312. Further, dispatcher 312 may be in step mode at the start of method 600. Thus, dispatcher 312 may hold the communication instead of forwarding the communication to data source(s). In other embodiments, dispatcher 312 may be in stream mode. Dispatcher 312 may, therefore, may also provide the communication to the appropriate data sources. MFA may be performed in addition to other authentication, such as certificate or user identification/password based authentication, performed by service 314-1 or another service. Although described in the context of authentication for access to a single data source, in some embodiments, method 600 may be used to authenticate client(s) for multiple data sources.

Service 314-1 calls a MFA utility 330-1, at 602. The MFA utility 330-1 contacted at 602 may be a third party MFA such as DUO. Alternatively, the MFA utility 330-1 may be part of the organization to which data source(s) 302 and/or 304 belong. MFA utility 330-1 performs multi-factor authentication for the requesting client, at 604. For example, suppose end user of client 306-2 has requested access to data source 304. The user identification and password may have been validated by service 314-1. At 602, the MFA utility 330-1 is called. Thus, the end user is separately contacted by MFA utility 330-1 at 604 and requested to confirm the user's by the MFA facility. For example, the end user may be required to enter a code or respond to a prompt on a separate device. As part of 604, service 314-1 is informed of whether the multi-factor authentication by MFA utility 330-1 is successful. Stated differently, as part of 604, service 314-1 receives from MFA utility 330-1 a success indication. The success indication informs MFA utility 330-1 of whether or not MFA authentication was successful.

If the multi-factor authentication by MFA utility 330-1 is successful, then service 314-1 instructs dispatcher 312 to forward communications to the requested data source 304, at 606. In some embodiments, in response to receiving a positive success indication (i.e. that MFA authentication is successful), service 314-1 directs dispatcher 312 to forward communications to the requested data source 304. In some embodiments, dispatcher 312 is instructed to change from step mode to stream mode at 606. Thus, subsequent communications may be provided both to the data source 304 and one or more service(s) 314. In other embodiments, dispatcher 312 is simply allowed to continue forwarding communications to data source 304 at 606. If, however, multifactor authentication was unsuccessful, service 314-1 instructs dispatcher 312 to prevent access to the requested data source 304, at 608. For example, in response to receiving a negative success indication (i.e. that MFA authentication is unsuccessful), service 314-1 directs dispatcher 312 to prevent access to the requested data source 304. In response, dispatcher 312 may instruct the corresponding routine to terminate the connection with the requesting client 106. If the communication has already been forwarded to data source 304, then dispatcher 312 also recalls the communication. In some embodiments, dispatcher 312 may be instructed to remain in step mode and the client requested to resubmit the credentials and/or another mechanism for authentication used. In some embodiments, other action(s) may be taken in response to MA being unsuccessful.

Using method 600 MFA may be provided for data source(s) 302 and/or 304 in a data agnostic manner. Certain data sources, such as databases typically do not support MFA. Thus, method 600 may provide additional security to such data sources without requiring changes to the code of data sources 302 and 304. Security of system 100 may thus be improved in a simple, cost effective manner.

Figure 7:
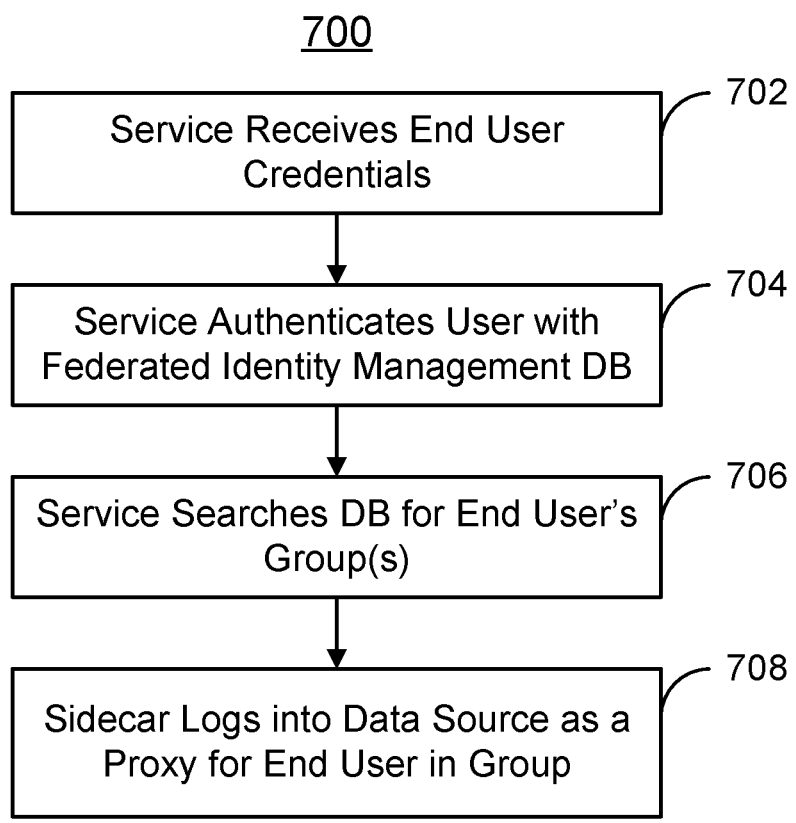
FIG. 7 is a flow chart depicting an exemplary embodiment of a method for performing federated identity management for a client for a data source.

FIG. 7 is a flow chart depicting an exemplary embodiment of method 700 for performing federated identity management for a client for a data source. Federated identity management allows end users to access various facilities in an organization, such as multiple databases, email, analytics or other applications, based on a group identity and using a single set of credentials. For example, an end user may be a data analyst in a finance department. The end user may thus be considered a member of three groups: employees, data analysts and the finance department. A user identification and password for the end user may allow the end user to access their company/employee email, applications for the finance department, databases including information used by the finance department such as financial projections for the organization, analytics applications accessible by data analysts and other data based on the end user's membership in various groups within the organization. Federated identity management may use protocols such as lightweight directory access protocols (LDAP) and directories defining the groups to which each end user belongs.

Method 700 is described in the context of system 300. However, method 700 may be used in connection with other systems including but not limited to systems 100 and 200. For simplicity, certain steps of method 700 are depicted. Method 700 may include other and/or additional steps and substeps. Further, the steps of method 700 may be performed in another order including performing portions or all of some steps in parallel. In some embodiments, method 700 may be considered to be used in implementing 506 of method 500. For the purposes of explanation, service 314-6 is considered to provide federated identity management. Method 700 may be considered to start after service 314-6 receives the communication from dispatcher 312.

Service 314-6 receives the end user's credentials, at 702. For example, dispatcher 312 forwards to service 314-6 a communication requesting access to data source 302. The communication may include the end user's user identification and password for federated identity management. In other embodiments, the end user credentials are otherwise associated with the communication but are provided to service 314-6. Service 314-6 authenticates the end user with a federated identity management utility or database 330-2, such as an LDAP directory, at 704. To authenticate the end user the user identification and password are utilized. Service 314-6 searches the federated identity management database 330-2 for the group(s) to which the end user belongs, at 706. Using one or more of the group(s) of which the user is a member, sidecar 310 logs onto the data source 302 as a proxy for the end user, at 708. The end user may then access data source 302 in accordance with the privilege and limitations of the group(s) to which the end user belongs.

Using method 700, federated identity management can be achieved for data source(s) 302 and/or 304. Some databases do not support federated identity management. Method 700 and sidecar 310 having data agnostic dispatcher 312 may allow for federated identity management for such databases without changes to the databases. Thus, an end user may be able to access the desired data sources. Further, the organization can manage access to the data sources using groups in the federated identity management database. This may be achieved without requiring changes to data sources 302 and 304. Because sidecar 310 accesses data sources 302 and/or 304 as a proxy for the end user, sidecar 310 may log activities of the end user. For example federated identity management service 314-6 may store information related to queries performed by the end user as well as the identity of the end user. Thus, despite using federated identity management to allow access to applications and data sources based on groups, the organization may obtain visibility into the activities of individual end users. In addition to improving ease of administration via federated identity management, improved information and control over individuals' use of data sources 302 and 304 may be achieved.

Figure 8:
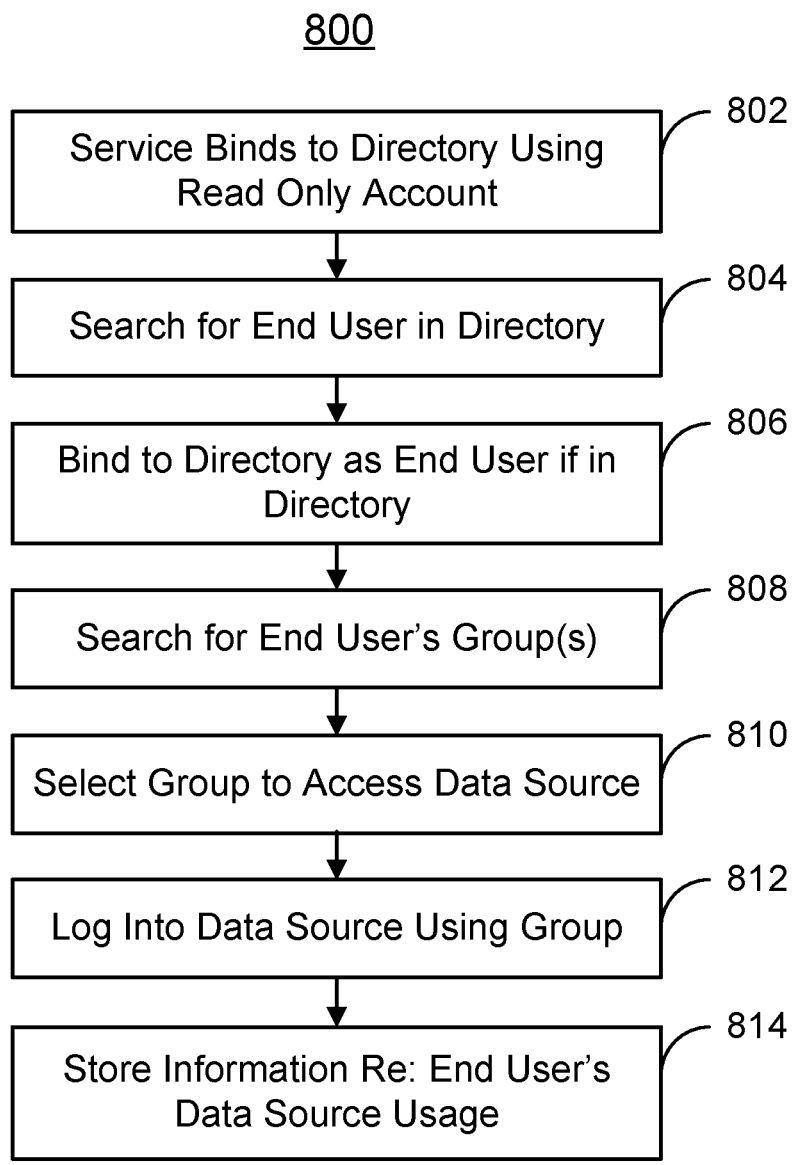
FIG. 8 is a flow chart depicting another exemplary embodiment of a method for authenticating a client for a data source using federated identity management.

FIG. 8 is a flow chart depicting an exemplary embodiment of method 800 for performing federated identity management for a client for a data source using an LDAP directory. Method 800 is described in the context of system 300. However, method 800 may be used in connection with other systems including but not limited to systems 100 and 200. For simplicity, certain steps of method 800 are depicted. Method 800 may include other and/or additional steps and substeps. Further, the steps of method 800 may be performed in another order including performing portions or all of some steps in parallel. In some embodiments, method 800 may be considered to be used in implementing 506 of method 500 and/or 704, 706 and/or 708 of method 700. For the purposes of explanation of method 800, service 314-6 is considered to provide federated identity management via LDAP. Method 800 is considered to commence after sidecar 310 is provided with a specialized account for LDAP directory 330-2. The specialized account allows sidecar 310 to obtain information from LDAP directory 330-2 that is not available to a typical end user, such as the identification of end users and the groups to which end users belong. In some embodiments, the account is a read only account for sidecar 310.

Service 314-6 binds to the LDAP directory using the read only account at 802. This may occur at some time before receipt of the end user's credentials and the request to access a data source using federated identity management. The binding of service 314-6 with the LDAP directory allows service 314-6 to provide federated identity management services in some embodiments.

A communication requesting access to data source(s) 302 and/or 304 is received at dispatcher 310 and provided to service 314-6 in a manner analogous to 502 and 504 of method 500. The communication includes the end user's LDAP credentials. Thus, the end user's LDAP credentials are received at service 314-6. After receiving the end user's LDAP credentials, service 314-6 may search for the end user in the LDAP directory using the read only account, at 804. Searching LDAP directory 330-2 allows service 314-6 to determine whether the user exists in LDAP directory 330-2. If not, sidecar 310 may prevent access to the desired data source(s). If, however, the end user is found at 804, then service 314-6 binds to the LDAP directory as a proxy for the end user, at 806.

Service 314-6 may then request a search for the groups to which the end user belongs, at 808. This is facilitated by the read only account for sidecar 310. Thus, service 314-6 may determine the groups to which the end user belongs as well as the privileges and limitations on each group. A group to be used for accessing the data source(s) 302 and/or 304 is selected at 810. In some embodiments, service 314-6 ranks groups based upon their privileges. A group having more privileges (e.g. able to access more data sources or more information on a particular data source) is ranked higher. In some embodiments, service 314-6 selects the highest ranked group for the end user. In some embodiments, service 314-6 selects the lowest ranked group. In some embodiments, the user is allowed to select the group. In other embodiments, another selection mechanism may be used.

The desired data source(s) are accessed using the selected group, at 812. Thus, the end user may access data and/or applications based upon their membership in the selected group. Information related to the end user's activities is logged by sidecar 310, at 814. For example, services 314-6 may directly log the end user activities or may utilize another service, such as query analysis, to do so.

Using method 800, an end user may be able to access the desired data sources via federated identity management performed through an LDAP directory. The benefits of federated identity management may thus be achieved. In addition, the end user's actions may be logged. Thus, visibility into the activities of individual end users may be obtained.

Figure 9:
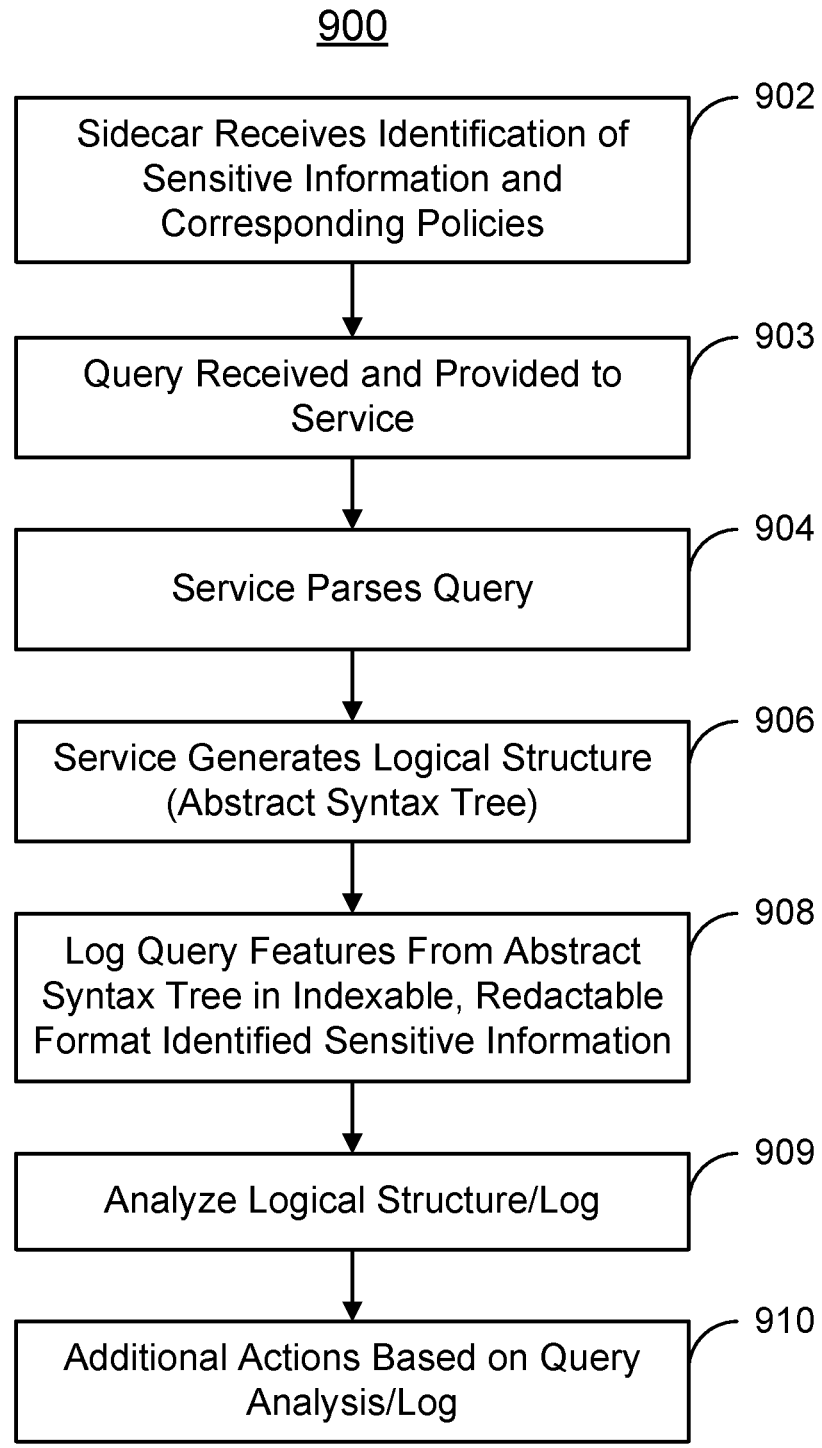
FIG. 9 is a flow chart depicting an exemplary embodiment of a method for analyzing and logging information related to queries of a data source.

FIG. 9 is a flow chart depicting an exemplary embodiment of method 900 for analyzing and logging information related to queries of a data source. Method 900 is described in the context of system 100. However, method 900 may be used in connection with other systems including but not limited to systems 200 and 300. For simplicity, certain steps of method 900 are depicted. Method 900 may include other and/or additional steps and substeps. Further, the steps of method 900 may be performed in another order including performing portions or all of some steps in parallel. In some embodiments, method 900 may be considered to be used in implementing 506 of method 500. For the purposes of explanation of method 900, service 114-1 is considered to provide query analysis and logging. Thus, a client, such as client 106-1 may be considered to be authenticated for data source(s) 102 and/or 104 and to perform a query for data on one or both of data sources 102 and 104. In some embodiments, the query may be an SQL query.

Sidecar 110 receives an identification of information of interest in the data source(s) 102 and/or 104, at 902. Also at 902, policies related to the sensitive information are also received. Reception of this information at 902 may be decoupled from receiving queries and analyzing queries for the remainder of method 900. For example, owner(s) of data source(s) 102 and/or 104 may indicated to sidecar 110 which tables, columns/rows in the tables, and/or entries in the tables include information that is of interest or sensitive. For example, tables including customer names, social security numbers (SSNs) and/or credit card numbers (CCNs) may be identified at 902. Columns within the tables indicating the SSN, CCN and customer name, and/or individual entries such as a particular customer's name, may also be identified at 902. This identification provides to sidecar 110 information which is desired to be logged and/or otherwise managed. Further, policies related to this information are provided at 902. Whether any logging is to be performed or limited is provided to sidecar at 902. For example, any user access of customer tables may be desired to be logged. The policies indicate that queries including such accesses are to be logged. Whether data such as SSNs generated by a query of the customer table should be redacted for the log may also be indicated in the policies.

Sidecar 110 receives a query from a client at dispatcher 112 and provides the query to service 114-1, at 903. The query may also be sent from dispatcher 112 to the appropriate data source(s) as part of 903. Process 903 is analogous to 502 and 504 of method 500. Thus, the query is received at service 114-1. Service 114-1 parses a query provided by a client 106, at 904. For example, a client 106-1 may provide a query for data source 102 to sidecar 110. Dispatcher 112 receives the query and provides the query both to data source 102 and to service 114-1. Service 114-1 parses the query to determine which operations are requested and on what portions of data source 102. Service 114-1 thus emits a logical structure describing the query and based on the parsing, at 906. In some embodiments, the logical structure is an abstract syntax tree corresponding to the query. Each node in the tree may represent a table being searched, operation in the query, as well as information about the operation. For example, a node may indicate a join operation or a search operation and be annotated with limitations on the operation.

The query is logged, at 908. The log may include the end user/client 106-1 that provided the query as well as the query string. In addition, the features extracted from the abstract syntax tree may be logged in a manner that is indexable or otherwise more accessible to analytics. Further, the log may be configured to be human readable. In some embodiments, a JSON log may be used. For example, a list of the operations and tables accessed in the query may be included in the log. Sensitive information such as SSN may be redacted from the log in accordance with the identification of sensitive information and policies relating to sensitive information received at 902. Thus, a placeholder may be provided in the log in lieu of the actual sensitive information accessed by the query. In some embodiments, the logical structure and/or log are analyzed at 909. This process may include analyzing the abstract syntax tree and/or information in the log.

Based on the query analysis and/or log, additional action may be taken by sidecar 110, at 910. For example, a query rewriting service that is part of service 114-1 or a separate service may be employed if it is determined in 909 that the log generated in 908 indicates that the query may adversely affect performance. For example, limits may be placed on a query, clauses such as an "OR" clause and/or a tautology identified and/or removed. As a result, queries that result in too many rows being returned may be rewritten to reduce the number of rows. If the log or other portion of the query analysis indicates that the query may represent an attack, then access to the data source may be denied at 910. For example, the analysis at 909 of the logical structure and log may indicate that the query includes wildcards or tautologies in users' names. The corresponding routine may terminate the connection to the client from which the query originated. If the query has been passed on to data source 102, then the query may be canceled at 910. Unwanted exfiltration of sensitive information may thus be prevented. If the query analysis indicates that a similar query was recently serviced, then some or all of the information for the similar query that already exists in a cache may be used to service the query. If the query can be completely serviced by information in the cache, then the query may be recalled from/canceled before or during servicing by data source 102. Thus, various actions may be taken based upon the analysis of the query by service 114-1.

For example, suppose as mentioned above that data source 102 includes a customer table of customer information having columns of customer names, customer SSNs, customer CCNs, tokenized CCNs (e.g. CCN encrypted with FPE or represented by a token), and customer identifiers (CIDs). Suppose data source 102 also includes an order table including a table of customer orders. The table includes a column of order customer identifiers (OCIDs) and multiple columns of orders for each customer identifier. In each order column, the item prices for the order are indicated. The order customer identifier for the order table is the same as the customer identifier in the customer table for data source 102. Query analysis and logging may be performed by service 114-1.

Figure 10:
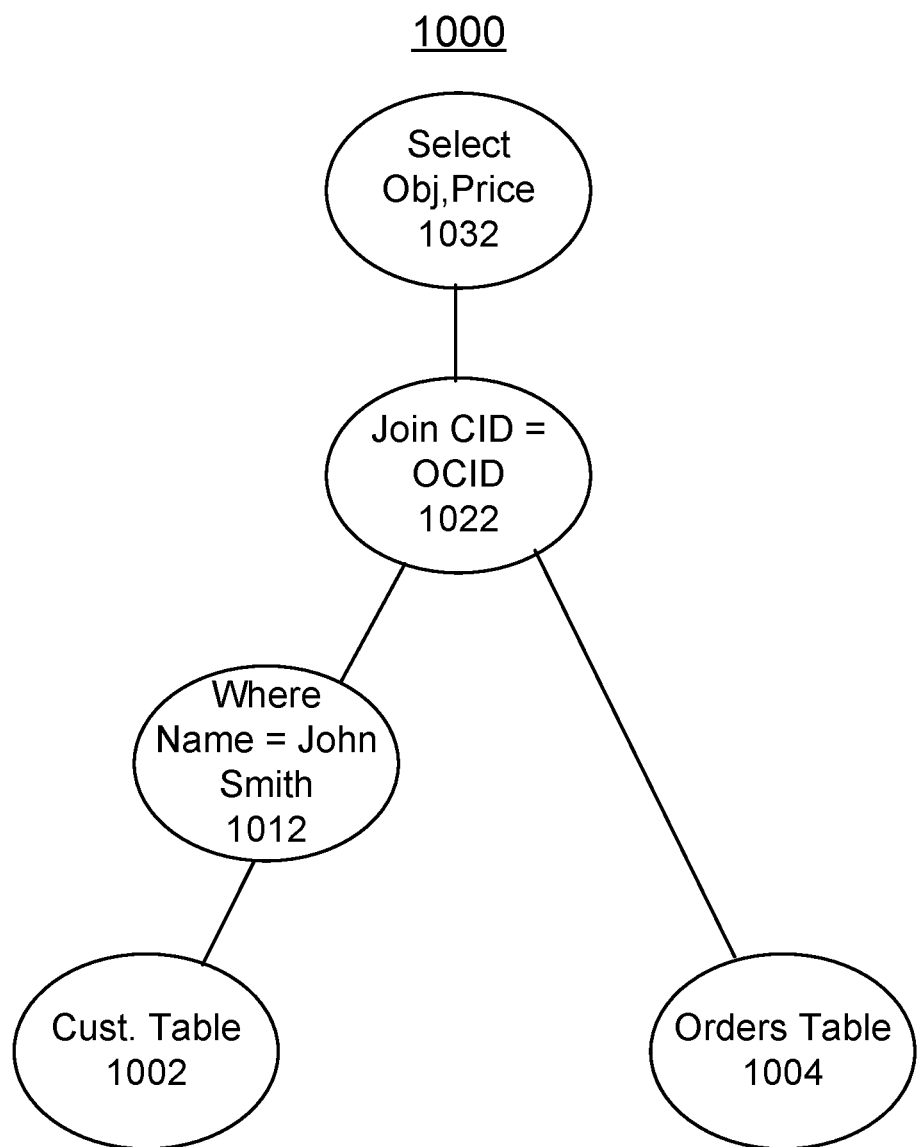
FIG. 10 is a diagram depicting an exemplary embodiment of an abstract syntax tree.

At 902, service 114-1 is informed that the customer table and the columns of customer names, customer SSNs and (tokenized) customer CCNs are sensitive information for which activity is desired to be logged. Also at 902, service 114-1 is informed that customer names and SSNs are to be redacted from the log. A query of data source 102 may be provided to dispatcher 112 by end user of client 106-1. Dispatcher 112 forwards the query to data source 102 and to service 114-1. The query is: select object price from customer table join order table on customer identifier=order customer identifier and where name=John Smith (where John is a name of a particular customer). Thus, the query determines the price of objects ordered by John Smith. FIG. 10 depicts the corresponding abstract syntax tree 1000 generated from the query at 906. The abstract syntax tree has been annotated for clarity. Nodes 1002, 1004, 1012, 1022 and 1032 and lines connecting nodes 1002, 1004, 1012, 1022 and 1032 represent the query. From abstract syntax tree 1002, a log is generated by service 114-1 at 908. The log indicates that the customer table has been accessed by end user of client 106-1, that column customer name was read, and the where name=[redacted] was accessed. This information may be provided in a format that is readily usable by analytics, indexable and/or searchable. In some embodiments, the string forming the query may also be provided in the log. However, because they were not identified as being of interest, the order table, CID, OCID and object price are not included in the indexable portion of the log.

Thus, using method 900, performance of system 100 may be improved. Method 900 may facilitate analysis of queries performed, aid in response to attacks, and/or improve performance of the data source. Because dispatcher 110 is data agnostic and may be a transport layer component, this may be achieved without requiring changes to data sources 102 and 104 while maintaining stability of the data sources 102 and 104. Thus, performance and security for system 100 may be enhanced.

Figure 11A:
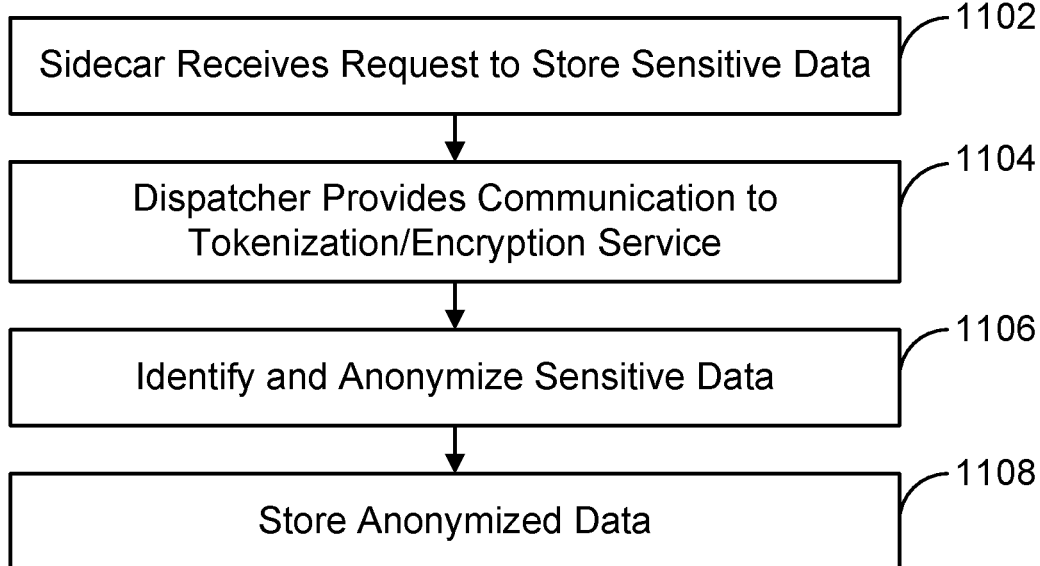
FIGS. 11A and 11B are flow charts depicting exemplary embodiments of methods for utilizing tokenization and/or encryption of sensitive data.
Figure 11B:
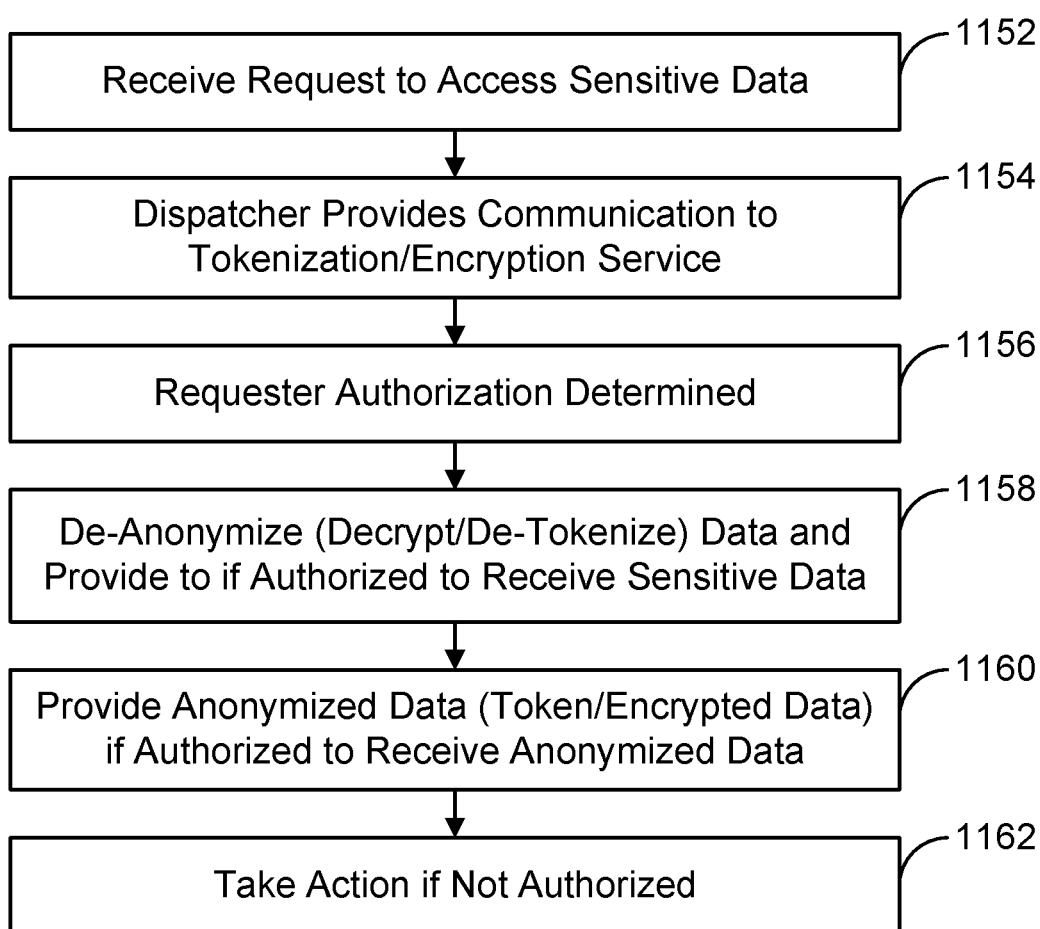

FIGS. 11A and 11B are flow charts depicting exemplary embodiments of methods for utilizing tokenization and/or encryption of sensitive data. FIG. 11A is a flow chart depicting an exemplary embodiment of method 1100 for using tokenization and/or encryption for storing data at a data source. Method 1100 is described in the context of system 300. However, method 1100 may be used in connection with other systems including but not limited to systems 100 and 200. For simplicity, certain steps of method 1100 are depicted. Method 1100 may include other and/or additional steps and substeps. Further, the steps of method 1100 may be performed in another order including performing portions or all of some steps in parallel. In some embodiments, method 1100 may be considered to be used in implementing 506 of method 500.

Method 1100 may be considered to start after system 300 receives policies indicating how sensitive data are to be treated. For example, policies indicating what data are sensitive (e.g. which tables/entries include sensitive data), what clients are allowed to have access to the sensitive data, for what purposes client(s) are allowed to have access to the sensitive data, how the sensitive data are to be anonymized (e.g. tokenized and/or encrypted), and/or other information desired by controller of data sources 302 and/or 304 have already been received by sidecar 310 and provided to the appropriate service(s). Although described in the context of access to a single data source, in some embodiments, method 1100 may be used for multiple data sources. In some embodiments, the same service fulfills request to store sensitive data and requests to obtain sensitive data. In some embodiments, some service(s) may service requests to store data/tokenize data while other service(s) are used obtain the tokenized data. However, such services communicate in order to service at least some of the requests. In some embodiments, the same service may utilize different types of anonymization (e.g. tokenization and encryption). In other embodiments, different services may be used for different types of anonymization. For example, one service may tokenize data while another service encrypts data. Method 1100 is described as being used in connection with method 1150. In other embodiments, method 1100 may be used with a different method for accessing encrypted/tokenized data.

A request from a client to store sensitive data at a data source is received by a sidecar, at 1102. The dispatcher, which is data agnostic, forwards the request to an encryption/tokenization service for anonymization of the sensitive data desired to be stored, at 1104. Based on the policies provided and/or capabilities of the services, the sensitive data is and anonymized, at 1106. In some embodiments, the data desired to be stored includes sensitive data desired to be anonymized as well as data that need not by anonymized. In such embodiments, 1106 also includes identifying the sensitive data to be anonymized. In some embodiments, anonymizing data includes encrypting and/or tokenizing the data. For some sensitive data, encryption such as format preserving encryption (FPE) may be used. For example, CCNs and SSNs may be encrypted using FPE such that the encrypted data has the same number of digits as the CCN and SSN (i.e. such that the format is preserved) but does not have intrinsic meaning. The alphanumeric string having nine members may replace an SSN. Other types of encryption, tokenization, and/or data masking may also be used at 1106. Thus, at 1106 the sensitive data is anonymized. Because policies may be used to determine how and what data are encrypted/tokenized, 1106 is performed on an attribute level. For example, the CCN of a user may be encrypted by FPE, but the SSN of the same user may be replaced by a token based on the policies used by the encryption/tokenization service. The anonymized data is stored in the data source, at 1108. Thus, the anonymized data may be retained in place of the actual sensitive data. In some embodiments, the sensitive data may also be stored, for example in a secure data vault, which may require enhanced authentication to access. Thus, using method 1100, sensitive data may be tokenized and/or encrypted and stored using a data agnostic dispatcher.

FIG. 11B is a flow chart depicting an exemplary embodiment of method 1150 for accessing tokenized and/or encrypted data from a data source. Method 1150 is described in the context of system 300. However, method 1150 may be used in connection with other systems including but not limited to systems 100 and 200. For simplicity, certain steps of method 1150 are depicted. Method 1150 may include other and/or additional steps and substeps. Further, the steps of method 1150 may be performed in another order including performing portions or all of some steps in parallel. In some embodiments, method 1150 may be considered to be used in implementing 506 of method 500. Method 1150 may be considered to start after system 300 receives policies indicating how sensitive data are to be treated. For example, policies indicating what data are sensitive (e.g. which tables/entries include sensitive data), what clients are allowed to have access to the sensitive data, for what purposes client(s) are allowed to have access to the sensitive data, how the sensitive data are to be anonymized (e.g. tokenized and/or encrypted), and/or other information desired by controller of data sources 302 and/or 304 have already been received by sidecar 310 and provided to the appropriate service(s). Although described in the context of access to a single data source, in some embodiments, method 1150 may be used for multiple data sources. In some embodiments, the same service fulfills request to store sensitive data and requests to obtain sensitive data. In some embodiments, some service(s) may service requests to store data/tokenize data while other service(s) are used obtain the tokenized data. However, such services communicate in order to service at least some of the requests. In some embodiments, the same service may utilize different types of anonymization (e.g. tokenization and encryption). In other embodiments, different services may be used for different types of anonymization. For example, one service may tokenize data while another service encrypts data. Method 1150 is described as being used in connection with method 1100. In other embodiments, method 1150 may be used with a different method for anonymizing data.

A request for the sensitive data stored at data source is received by the sidecar, at 1152. The request may come from the same client that stored the data or a different client. Because request(s) for data may be independent of storage, 1152 through 1162 may be decoupled from 1102 through 1108. For example, the request may be received at 1152 at a different time, or may not be received. Thus, methods 1100 and 1150 are separately described. The dispatcher provides the request to access sensitive data to encryption/tokenization service, at 1154. The request may also be forwarded to the data source storing the anonymized data.

The encryption/tokenization service determines what type of authorization the requestor possesses, at 1156. The requester may only be authorized to receive the anonymized (e.g. tokenized/encrypted) data. For example, the requesting client might be a computer system of data scientist associated with system 300. The data scientist/client may be allowed to track use of a credit card number, but not be authorized to know the actual credit card number. The requester may be authorized to receive the original, sensitive data. For example, the requesting client might be a merchant's payment system or the original user's computer systems, both of which may be authorized to receive the de-anonymized (e.g. unencrypted/de-tokenized) sensitive data. However, the requester may be unauthorized to receive either data. For example, the requesting client might be a malicious individual attempting to steal the sensitive data. At 1156, therefore, the encryption/tokenization service validates credentials for the requesting client. The encryption/tokenization service may use passwords, certificates, multi-factor authentication, behavioral baselining through collector(s) and/or other mechanism(s). Thus, encryption/tokenization service may call another service to perform authentication at 1156.

If the requesting client is determined to be authorized to receive the sensitive data, then the anonymized data stored at the data source is retrieved, de-anonymized and provided to client, at 1158. For example, encryption/tokenization service may decrypt and/or detokenize the data that was stored in the data source. In another embodiment, instead of or in addition to decrypting/detokenizing the data, encryption/tokenization service may retrieve the original, sensitive data from a secure data vault (not shown in FIGS. 3 and 11A-11B). The sensitive data is then sent to the authorized requester at 1158.

If the requesting client is determined to be authorized to receive only the anonymized data, then this anonymized data are retrieved and sent to the requester, at 1160. For example, encryption/tokenization service may simply retrieve the anonymized data from the data source and forward this data to the requesting client. In some embodiments, a requester may be authorized to receive either or both of the sensitive data and the anonymized data. In such embodiments, 1158 and/or 1160 may include determining whether the requester has selected the anonymized/de-anonymized data and providing the anonymized/de-anonymized data. In some embodiments, both the anonymized and the de-anonymized data might be provided.

If, however, it is determined that the requester was not authorized, then other action is taken at 1162. For example, the routine may terminate the connection to client as described above, the communication may be recalled from the data source, the client may be blacklisted, managers of system 300 and/or owner of the sensitive data may be notified of the attempted breach and/or other action taken. For example, as discussed above, the corresponding routine may terminate the connection to the client from which the query originated. If the query has been passed on to the data source, then the query may be canceled at 1162. Unwanted exfiltration of sensitive information may thus be prevented.

Although described in the context of anonymized data at 1106 and storing the anonymized data at 1108, in another embodiment, step 1106 might be skipped and the sensitive data stored at 1108. However, in such embodiments, at 1158 no decryption is performed for the requester determined to be authorized to receive the sensitive data. Further, for requesters determined to be authorized to receive only encrypted/tokenized data, the data are encrypted/tokenized and then provided at 1160. Thus, methods 1100 and 1150 may be adapted to the case where sensitive data are stored.

For example, a request from client 306-1 to store sensitive data at data source 302 may be received by sidecar 310, at 1102. Dispatcher 312 forwards the request to encryption/tokenization service 314-2 for anonymization, at 1104. Based on the policies provided and/or capabilities of encryption/tokenization service 314-2, the sensitive data is identified and anonymized, at 1106. For example, encryption/tokenization service 314-2 may encrypt some sensitive data and tokenize other sensitive data. The anonymized data is stored in data source 302, at 1108.

A request from client 306-2 for the sensitive data stored at the data source is received by the sidecar 310, at 1152. Dispatcher 310 provides the request to access sensitive data to encryption/tokenization service 314-2, at 112. The request may also be forwarded by dispatcher 312 to data source 302.

Encryption/tokenization service 314-2 determines what type of authorization the requestor possesses, at 1156. Thus, encryption/tokenization service 314-2 validates credentials for the requesting client 306-2.

If the requesting client 306-2 is determined to be authorized to receive the sensitive data, then the anonymized data stored at data source 302 is retrieved, decrypted/detokenized and provided to client 306-2, at 1158. In another embodiment, instead of or in addition to decrypting/detokenizing the data, encryption/tokenization service 314-2 may retrieve the original, sensitive data from a secure data vault. The sensitive data is then sent to the authorized requester. If the requesting client 306-2 is determined to be authorized to receive only the anonymized data, then encryption/tokenization service 314-2 retrieves the anonymized data from data source 302 and forwards this data to the requesting client 306-2. If, however, it is determined that the requester was not authorized, then the routine may terminate the connection to client 306-2, the communication may be canceled or recalled from data source 302, client 306-2 may be blacklisted, managers of system 300 and/or owner of the sensitive data (e.g. user of client 306-1) may be notified of the attempted breach and/or other action taken.

Using methods 1100 and 1150 sensitive data may be more securely stored and retrieved. Instead of storing sensitive data, anonymized data may be stored at 1108. How and what data are anonymized may be determined on an attribute level, which improves flexibility of methods 1100 and 1150. This improves the ability of system 300 and methods 1100 and 1150 to protect sensitive data from being inappropriately accessed. Because these functions are provided via service(s) 314, the enhanced security may be provided for data source(s) 302 and/or 304 that do not otherwise support encrypted data. Stated differently, secure storage and encryption/tokenization of data may be performed in a data agnostic manner. Thus, methods 1100 and 1150 may provide additional security to such data sources without requiring changes to the code of data sources 302 and 304. Security may thus be improved in a simple, cost effective manner.

Figure 12A:
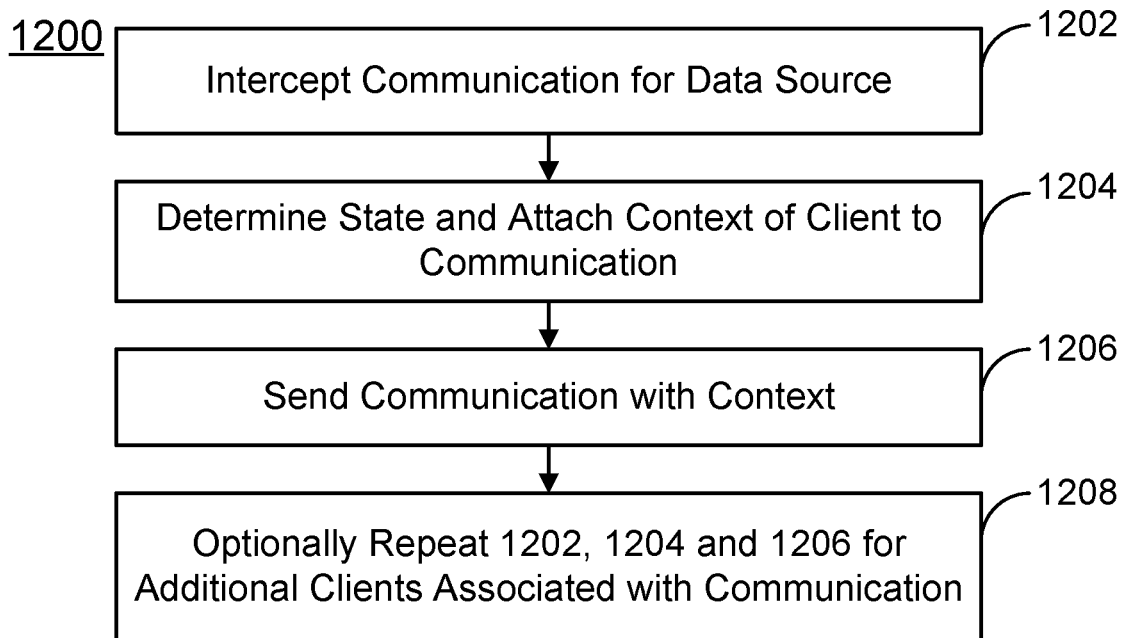
FIGS. 12A and 12B are flow charts depicting exemplary embodiments of methods for providing client information and for performing behavioral baselining for clients.
Figure 12B:
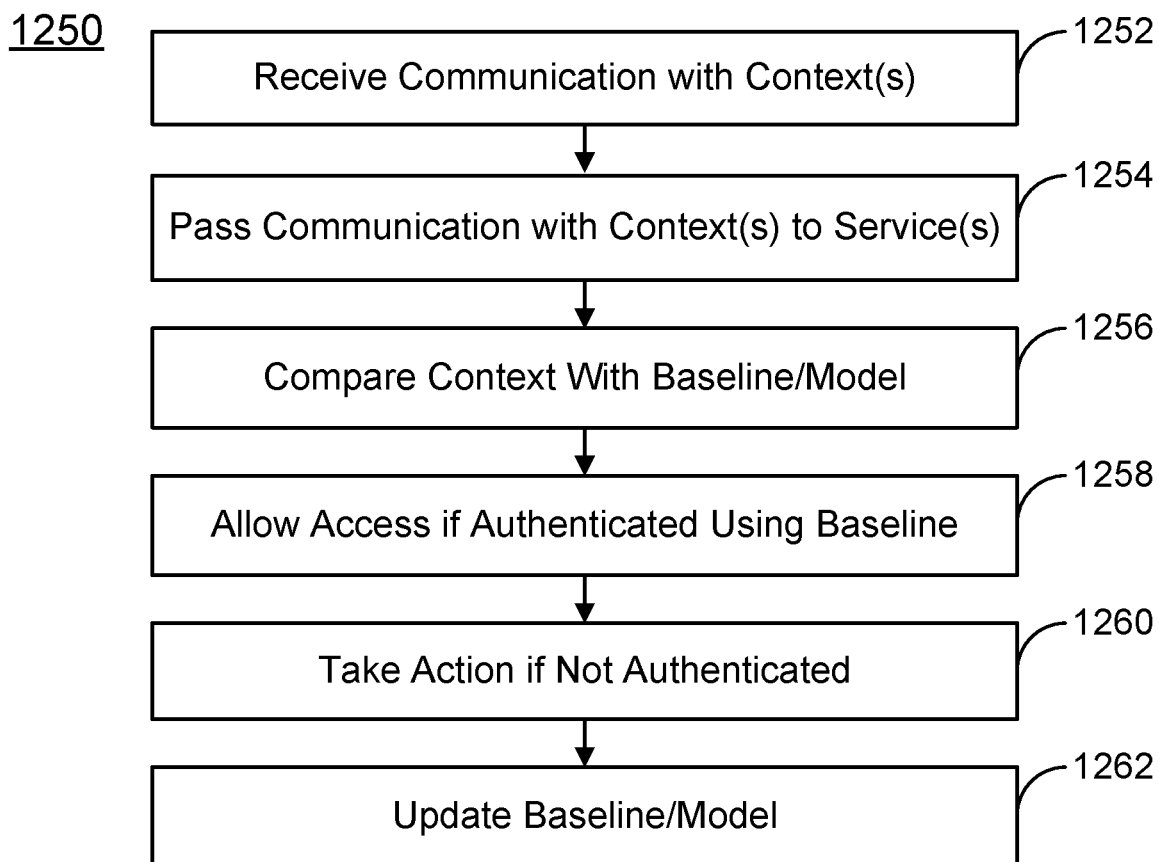

FIGS. 12A and 12B are flow charts depicting exemplary embodiments of methods for providing client information and for performing behavioral baselining for clients. FIG. 12A is a flow chart depicting an exemplary embodiment of method 1200 for providing client information and may be used as part of performing behavioral baselining for a client. Method 1200 is described in the context of system 300. However, method 1200 may be used in connection with other systems including but not limited to systems 100 and 200 that employ collectors such as collectors 320. For simplicity, certain steps of method 1200 are depicted. Method 1200 may include other and/or additional steps and substeps. Further, the steps of method 1200 may be performed in another order including performing portions or all of some steps in parallel. In some embodiments, method 1200 may be considered to be used in implementing 506 of method 500. Method 1200 is described in the context of clients 306-2 and 306-3, collectors 320-2 and 320-3, service 314-2 and data source 302. Thus, method 1200 commences after collectors 320 have been provided on one or more clients 306 utilizing data sources. However, in other embodiments, other clients, collectors, service(s) and/or other data sources may be used.

Communications for data source(s) to be issued by a client are intercepted, for example by a collector at the client, at 1202. In some embodiments, queries, method or API calls, commands or other messages may be intercepted before being provided from the client for transmission to the sidecar. In some embodiments, for example, a collector may attach itself to a client application and use Java Database Connectivity (JDBC) to intercept queries from the client of the data source(s). Thus, the collectors monitor the corresponding clients and intercept particular calls.

The state of the client issuing the communication is determined and attached to/associated with the intercepted communication, at 1204. For example, the type of call, the type of session/session identification, user identification for the session, the type of command (e.g. get, put, post, and delete commands), APIs, IP address, query attributes, method calls, order of queries, and/or application making the calls may be detected by the collector and attached to the communication at 1204. These attributes represent the context, or state, of the client (or client application) when issuing the communication. The collector attaches this context/state to the query or other communication being provided from the client. The communication and attached state are sent from the client, at 1206. In some embodiments, the attached state may be considered to be part of or included in the communication sent from the client.

In some embodiments, other clients may receive the communication from the sending client, perform other functions and then issue another communication. Thus, multiple clients may send and receive a communication before the communication is provided to the sidecar or data source. At each client that includes a collector and that receives the communication, any outgoing communication is intercepted as in 1202, the context for that client is determined and attached to the communication as in 1204 and the communication and state/context sent as in 1206, via 1208. If only a single client having a collector sends the communication to the sidecar, then 1208 may be omitted. If five clients having collectors send the communication in series, then the originating client performs 1202, 1204 and 1206. 1208 may be repeated four times for the four additional clients receiving and sending the communication. If five clients, only four of which have collectors, receive the communication in series, then 1208 may be repeated three times. Thus, multiple clients may be involved in providing a communication to the data source. Each of the clients having a collector can attach their state to the communication. Further, the states may be attached in the order in which the clients sent/received the communication. The last client sending the communication provides the communication to a sidecar, such as sidecar 310.

Thus, using method 1200, the context for a client can be provided to along with the communication. For clients providing multiple communications, the series of contexts provided with these communications may represent typical behavior for the client during interaction with the data source. Thus, the client(s) may send information relating to their state and/or behavior in addition to communications such as queries.

FIG. 12B is a flow chart depicting an exemplary embodiment of method 1250 for performing behavioral baselining for a client. Method 1250 is described in the context of system 300. However, method 1250 may be used in connection with other systems including but not limited to systems 100 and 200 that employ collectors such as collectors 320. For simplicity, certain steps of method 1250 are depicted. Method 1250 may include other and/or additional steps and substeps. Further, the steps of method 1250 may be performed in another order including performing portions or all of some steps in parallel. In some embodiments, method 1250 may be considered to be used in implementing 506 of method 500. Method 1250 is described in the context of clients 306-2 and 306-3, collectors 320-2 and 320-3, service 314-2 and data source 302. Thus, method 1250 commences after collectors 320 have been provided on one or more clients 306 utilizing data sources. However, in other embodiments, other clients, collectors, service(s) and/or other data sources may be used. Method 1250 may be performed in conjunction with method 1200 and so may receive communications and states/contexts provided via method 1200.

The communication and context(s) of the client(s) are received at the sidecar, at 1252. The sidecar thus receives the communication, which may include multiple queries or method calls, as well as the states of all clients having collectors which sent the communication along before reaching the sidecar. In some embodiments, the communication and attached context(s) are received at the dispatcher. In some embodiments, the communication and attached context sent by the client at 1206 or 1208 of method 1200 is received at the sidecar at 1252.

The context(s) are forwarded from the dispatcher to behavioral baselining service(s), at 1254. In some embodiments, the communications with which the context(s) are associated are also provided to the behavioral baselining service(s) at 1254. Also at 1254, the dispatcher may send the communication on to the desired data source(s). Thus, processing of the query or other calls in the communication may not be delayed by inspection of the context(s) of clients and other functions performed by behavioral baselining service(s). In other embodiments, the communication may be held at the dispatcher until behavioral baselining is completed. This may occur, for example, if the dispatcher is in step mode described above.

The state(s)/context(s) for the client(s) associated with the communication are compared with baseline(s) for client(s), at 1256. In some embodiments, the communication is also part of this comparison. For example, the particular query of the database provided by the client as well as the state of the client may be used for comparison with the baseline. In other embodiments, just the context(s) might be used. In some embodiments, a single context of a client associated with a single communication is compared to the baseline(s) at 1256. In other embodiments, multiple contexts that may be in a particular order of a client are compared to the baseline at 1256. For example, the behavioral baselining service may store the context received for each communication for each client having a collector. Frequently, a client issues multiple communications for a data source when utilizing the data source. A set of these contexts for a particular client represents the behavior of that client around the time the client interacts with the data source. The behavioral baselining service analyzes the behavior (series of contexts) of the client(s) providing the communication(s). In some embodiments, only the identities of the contexts are used. In some embodiments, the identities of the contexts as well as their order are used for comparison. In some embodiments, the behavioral baselining service compares the context(s) to the behavior based upon a model of the behavior (the series of states/contexts), such as a Hidden Markov Model. Thus, in 1256 the behavioral baselining service maintains a model of requesting client(s)' behavior and compares the context in the current communication to the behavior. In some embodiments, a single context may be compared to the baseline in some cases and behavior in others. For example, for a first communication received by the sidecar, that first communication may be compared to the baseline. As additional communications are received, these communications may be compared to the baseline at 1256. In other embodiments, a client might first be authenticated and granted access to a data source based on another method of authentication, such as MFA. Once the client sends additional communication(s) with additional context(s), these communication(s) and context(s) may be used to compare the behavior for the client with the baseline. In some embodiments, the initial communication and authentication may be considered part of the behavior. In other embodiments, the initial communication and authentication may be considered separately from subsequent communication(s) and state(s).

If the context(s) for the current communication(s) sufficiently match the behavior, then the requesting client(s) are allowed access to the data source, at 1258. Thus, the data source is allowed to service the communication(s) provided by the client(s). If it is determined in 1256 that the context does not sufficiently match the behavior, then the desired action is taken, at 1260. In some embodiments, the action taken may depend upon the mismatch determined in 1256 or on other factors. For example, the client(s) initiating the communication(s) may not be allowed to access the data source. In such cases, the dispatcher may be informed and the corresponding routine used to terminate the connection to client(s). If the communication had already been forwarded to the data source(s), then the communication may be recalled from the data source(s). If the client had previously been authenticated, then the authentication may be revoked. In such embodiments, the dispatcher may be informed the client is unauthorized and the corresponding routine used to terminate the connection to client(s). Communication(s) that had been forwarded to the data source(s) may also be recalled from the data source(s). If the mismatch is sufficiently great or occurs greater than a threshold number of times, or at least a particular number of times in a row, then the client(s) may be blacklisted. In some embodiments, a secondary mechanism of authentication, such as MFA, may be invoked at 1260. Thus, access to the data source(s) may be determined at least in part based upon behavior of the requesting client(s). These and/or other actions may be taken at 1260.

The model/baseline may be updated, at 1262. For example, if it is determined that the context sufficiently matches the behavior at 1258, then the model/baseline may be updated with the context in the communication from client(s). If the context is considered inconsistent with the baseline, then the model/baseline may be updated with this information.

For example, suppose collector 320-2 in client 306-2 intercepts a communication including a query of data source 302 at 1202. The context of client 306-2 is determined by collector 320-2 and attached to the query. Client 306-2 then provides the communication and context to sidecar 310. Because client 306-2 provides the communication to sidecar 310 without providing the communication to another client 306, 1208 is skipped. Dispatcher 312 receives the communication at 1252 and provides the communication and context to behavioral baselining service 314-2 at 1254. The communication is also passed to data source 302 at 1254. Behavioral baselining service 314-2 compares the context received at 1254 to the baseline for client 306-2 at 1256. If the context received is consistent with the baseline, then access is allowed to data source 302, at 1258. Otherwise, access may be denied, for example the connection terminated, at 1260. Additional actions may also be taken at 1260 such as blacklisting client 306-2. The baseline may also be updated at 1262.

In some cases, multiple applications in multiple clients may pass a communication before the communication is sent to a data source. For example, this may occur where microservices are employed, as discussed above. For example, suppose collector 320-2 in client 306-2 intercepts the communication including a query of data source 302 at 1202. The state of client 306-2 is determined by collector 320-2 and attached to the query. Client 306-2 then provides the communication and state to client 306-3. In some cases, client 306-3 may add another query to the communication or otherwise modify the communication. Collector 320-3 in client 306-3 intercepts the communication, attaches the state of client 306-3 and provides the communication to sidecar 310 at 1208. Thus, the communication now includes the states of clients 306-2 and 306-3. If client 306-2 or 306-2 had passed the communication to client 306-4, which does not include a collector, then 1208 would be skipped for client 306-4 because no collector is present to determine and attach the state of client 306-4 to the communication. Dispatcher 312 receives the communication at 1252 and provides the communication and states to behavioral baselining service 314-2 at 1254. The communication is also passed to data source 302 at 1254. Behavioral baselining service 314-2 compares the states received at 1254 to the baselines for clients 306-2 and 306-3 at 1256. If the states received are consistent with the baselines, then access is allowed to data source 302, at 1258. Otherwise, access may be denied, for example the connection terminated and the communication recalled from data source 302, at 1260. Additional actions may also be taken at 1260 such as blacklisting client 306-2 and/or 306-3. The baseline(s) may also be updated at 1262.

Using methods 1200 and 1250, security and performance for data sources may be improved. The context(s)/state(s) of client(s) in communications requesting access to data source(s) may be analyzed to determine whether the communication is consistent with previous behavior of client(s). If the state(s) of the client(s) are inconsistent with the baseline, then access to the data source(s) may be prevented and/or additional action taken. Methods 1200 and 1250 may also be extended to compare behavior (a series of states, for example for multiple queries) of clients to previous behavior and authenticate clients based upon their behavior. Thus, attacks from a client that has been hijacked may be detected and addressed. Further, collectors need not be present on all clients to enhance security. Instead, if a sufficiently high fraction of clients include collectors, data sources may be protected in a manner akin to herd immunity. Methods 1200 and/or 1250 may be coupled with other methods, such as query analysis in method 900, authentication using method 400, tokenization in method 1100 and/or MFA in method 600 to further improve security.

As indicated above, various services may be combined. For example, sidecar 310 may provide multifactor authentication and/or federated identity management via service 314-1, query analysis via service 314-2, query rewriting via service 314-3 (or as part of service 314-2), behavioral baselining via service 314-4, tokenization of sensitive data via service 314-5, and/or other service other functionality via service 314-6. In such embodiments, dispatcher 312 may forward some or all of the request to multiple services 314 and/or services 314 may communicate with other services in order to perform the desired functions. Thus, performance of and security for data sources 302 and/or 304 may be improved by a variety of services without altering data sources 302 and/or 304. Moreover, new services may be added to sidecar 310 for data source(s) 302 and/or 304 by adding service module or updating services 314. These new services may be added without altering the code of data sources 302 and 304. Thus, performance, security and/or other features of system 300 can continue to be improved.

The techniques described herein may also be used in performing proxy services. A proxy may provide a gateway to a data source, such as a database. Proxies are typically monolithic and perform a variety of functions. For example, proxies may control access to the data source, perform load balancing for requests within a connection, manage load balancing between connections, perform multiplexing for a variety of clients, manage the state of the database and session, as well as perform a variety of other predetermined functions. Such proxies are typically expensive, challenging to implement and may be subject to attack. Accordingly, what is desired is an improved mechanism for managing access to data sources.

A mechanism for managing access to a database is described. In some embodiments, the mechanism can include one or more of a method, a processor configured to execute instructions store on and/or provided by a memory coupled to the processor, a computer program product embodied on a computer readable medium that may be nontransitory and/or tangible, and/or another mechanism or technique. A connection to the database is intercepted. The connection is assigned to an instance of the database. A sidecar is configured to proxy the connection to the database. In proxying the connection, the sidecar is stateless and passes all communications for the connection to the instance of the database. In some embodiments, the sidecar has a form factor selected from Docker, Kubernetes, cloud lambda, Debian, RPM and/or another form factor. The sidecar may include an open systems interconnection (OSI) Layer 4 dispatcher. In some embodiments, additional functionality may be provided utilizing one or more OSI Layer 7 services. For example, in addition to passing the communications to the instance of the database, the dispatcher may provide at least a portion of the communications to the OSI Layer 7 service(s). The OSI Layer 7 service(s) may perform a variety of functions, for example authentication, policy enforcement, encryption, analysis of communications, other functions described herein, and/or additional function(s). In some embodiments, at least some or all of the communications for the connection are encrypted before being passed to the instance of the database. In some embodiments, the method may include authenticating a client requesting the connection. In some such embodiments, the connection may be assigned to the instance of the database only if the client is authorized to access the database. In some embodiments, the connection for the client is assigned to the instance of the database, but is terminated if it is determined that the client is not authorized to access the database. In some embodiments in which the client is authenticated, at least one of the communications is passed by the sidecar to the instance of database and recalled the communication(s) before processing by the instance of the database if the client is not authorized to access the database.

Figure 13:
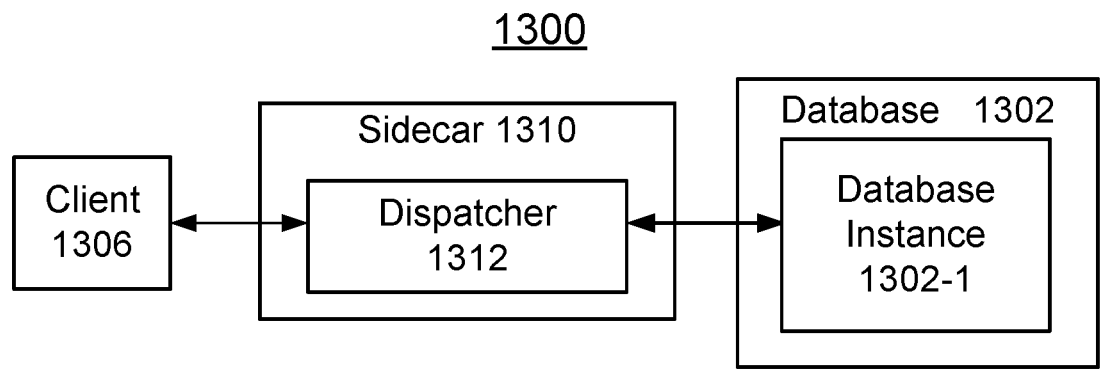
FIG. 13 is an exemplary embodiment of a system including a sidecar usable for stateless proxying.

FIG. 13 is an exemplary embodiment of system 1300 that manages access to database 1302. System 1300 includes sidecar 1310, dispatcher 1312, database 1302 and client 1306. Although a single sidecar 1312, database 1302 and client 1306 are shown, multiple sidecars, databases and/or clients may be present.

Database 1302 contains and organizes data, which may include sensitive data only some clients are authorized to access. For example, database 1302 may be a My SQL database, a Cassandra database, a BigQuery database, a MongoDB database and/or another database. Consequently, sessions in which database 1302 is utilized by client 1306, the protocols (e.g. transmission control protocol (TCP)) and/or communications used may inherently include information related to the state of database 1302 and the corresponding session. For example, requests to database 1302 may be self-descriptive and self-contained. Stated differently, the information needed to process the request, including the state (e.g. preceding events and/or interactions with client 1306), are embodied in the request. As such, connections between client 1306 and database 1302 may be long lived and stateful.

Client 1306 may be a computer system for an end user and/or may be an application which provides requests, or queries, to database 1302. Client 1306 may be part of the same organization as the database 1302 or may be for outside users of database 1302. For example, client 1306 and database 1302 may be part of the same business organization coupled by an internal network. In some embodiments, client 1306 may be an outside user of database 1302 connected to dispatcher 1312 and/or database 1302 via the Internet or other external network.

Sidecar 1310 is configured such that its operation is data agnostic. In the embodiments shown, sidecar 1310 includes dispatcher 1312, which is a transport layer component (e.g. an OSI Layer 4 component). Dispatcher 1312 thus performs limited functions and is not a Layer 7 (application layer) component. Because it is data agnostic, sidecar 1310 may be used with databases 1302 that have different platforms, are different databases, or are otherwise incompatible. For example, sidecar 1310 may be used in conjunction with a MySQL database, a Cassandra database, a BigQuery database, a MongoDB database and/or another database.

Sidecar 1310 is configured to function as a proxy for a connection between client 1306 and database 1302. For example, sidecar 1310 listens for requests for database 1302. Thus, a connection, or request for a connection, to database 1302 from client 1306 is intercepted by sidecar 1310. The connection is assigned to an instance of database 1302 ("database instance 1302-1). As used herein, a database instance includes an identification of the database that is an endpoint for the corresponding connection. For example, a database instance may include a TCP port for the database and a TCP connection. Sidecar 1310 is configured to proxy this connection to database 1302. In functioning as a proxy to database instance 1302-1, sidecar 1310 is a stateless, performs no load balancing within the connection and provides no load balancing between different connections. The connection between client 1306 and database instance 1302-1 is indicated by dual headed arrows in FIG. 13.

Sidecar 1310 passes communications for this connection between client 1306 and database instance 1302-1. A communication includes a request, a query such as a SQL query, or other transmission between client 1306 and database instance 1302-1. In some embodiments, dispatcher 1312 of sidecar 1310 listens for and intercepts all incoming communications from client 1306 for database instance 1302-1. Once the connection is established, sidecar 1310 passes all of these communications on to database instance 1302-1. For example, dispatcher 1312 may pass communications from client 1306 to an internal network (not explicitly denoted in FIG. 13) which transmits the communications to database instance 1302-1. Similarly, in some embodiments, dispatcher 1312 listens for and intercepts all outgoing communications from database instance 1302-1 for client 1306. Dispatcher 1312 may also pass all these communications to client 1306. For example, dispatcher 1312 may pass the communications to the Internet or other external network through which the communications are transferred to client 1306. Although dispatcher 1312 may perform some inspection of communications, to ensure that the communication is part of the connection, dispatcher 1312 does not make decisions as to whether communications are forwarded. Instead, dispatcher 1312 passes communications for the connection to database instance 1302-1 and/or client 1306.

Thus, dispatcher 1312 does not significantly impede the flow of traffic. Dispatcher 1312 also does not perform load balancing within the connection between client 1306 and database instance 1302-1. Instead, all incoming communications for the connection are passed by dispatcher 1312 to database instance 1302-1. Similarly, in some embodiments, all outgoing communications for the connection are passed by dispatcher 1312 to client 1306. Dispatcher 1312 does not perform load balancing between connections. In some embodiments, therefore, dispatcher 1312 does not interact with other connections, other clients (not shown in FIG. 13), and other instances (not shown) of database 1302, other databases (not shown) while configured to service the connection between client 1306 and database instance 1302-1. In some embodiments, dispatcher 1312 services multiple connections for client 1306 and/or other clients. However, dispatcher 1312 may not perform load balancing between these connections. Thus, dispatcher 1312 treats such connection independently. Dispatcher 1312 also may not perform load balancing within each of the connections. Sidecar 1310, as well as dispatcher 1312, are also stateless when functioning as a proxy for the connection between client 1306 and database instance 1302-1. Thus, sidecar 1310 and dispatcher 1312 do not track or manage the state of the session between client 1306 and database instance 1302-1. Instead, the nature of the connection to database instance 1302-1 and the properties of communication to database 1302 are utilized by database 1302 to determine the state of the session.

In some embodiments, additional services may be performed for the connection via sidecar 1312. For example, enforcement of certain policies, encryption, authentication, digital certificate management and/or other activities may be carried out. In some embodiments, these additional services are performed asynchronously. The services may be considered to be asynchronously performed because in some instances completion of the functions for the services does not require the corresponding communications to be stalled. For example, additional functionality may be provided utilizing one or more OSI Layer 7 services (not shown in FIG. 13). In addition to passing the communications to database instance 1302-1, dispatcher 1312 may provide at least some of the communications to OSI Layer 7 service(s). Such an OSI Layer 7 service may, for example, encrypt and/or decrypt data for such communications between database instance 1302-1 and client 1306. In some embodiments, client 1306 may be authenticated in order to obtain access to data stored by database 1302. In some embodiments, this authentication may be performed by an OSI Layer 7 service. In such embodiments, communication(s) are passed by sidecar 1312 to database instance 1302-1 and to the OSI Layer 7 authentication service. The authentication service determines whether client 1306 is authorized to access the desired data in database 102. If the client is not authorized, the communication(s) passed by dispatcher 1312 to database instance 1302-1 may be recalled before processing by database instance 1312. In some embodiments, the connection may be assigned prior to authentication. The connection is terminated if client 1306 is determined to be unauthorized to access database 1302. In other embodiments, the connection may be assigned to database instance 1302-1 only if client 1306 is authorized to access the database (i.e. client 1306 has been authenticated). In some embodiments, dispatcher 1312 only forwards communications to database instance 1302-1 if client 1306 is authorized to access database 1302. For example, the step mode described herein may be utilized. Other services, such as analysis of communications and enforcement of desired policies, may be implemented similarly using OSI Layer 7 services. For example, a policy preventing exfiltration of certain data may be provided by passing communications to an OSI Layer 7 service. The service may determine that the data requested from or returned by database instance 102-1 should not be provided to client 1306. The service may prevent or recall the corresponding communication and/or instruct dispatcher 1312 to terminate the connection. In some embodiments, some or all services may be performed in another manner. For example, an additional component (not shown) between dispatcher 1312 (or sidecar 1310) and database instance 1302-1 and/or between dispatcher 1312 (or sidecar 1310) and client 1306 may be used to provide services such as encryption.

Use of sidecar 1310 may improve system 1300. Sidecar 1310 may provide stateless proxying that is free of load balancing. Because of its configuration, sidecar 1310 may be more easily and inexpensively provided for use in system 1300. For example, the form factor of sidecar 1310 may allow sidecar 1310 to be more readily delivered to and used in system 1300. In some embodiments, sidecar 1310 has a form factor selected from a Docker image, a Kubernetes package, a cloud lambda package, a Debian package, an RPM package and/or an analogous format. Thus, sidecar 1310 may be provided via a container for the desired format. Deployment of sidecar 1310 may thus be simplified. Further, sidecar 1310 may be used to provide policy enforcement, security, authentication, encryption, and/or other services. Sidecar 1310 may also be data agnostic. Thus, sidecar 1310 may be used with a variety of databases 1302. Further, sidecar 1310 need not protect every component within a particular organization. Instead, only selected databases 1302 may be protected. Multiple sidecars 1310 may be configured for multiple connections to one or more databases 1302. Thus, system 1300 may be readily extended to larger numbers of clients and/or additional databases. Further, the level of security and/or functions provided by sidecar 1310 may differ for different databases, different clients and/or different connections. Thus, performance of system 1300 may be enhanced.

Figure 14:
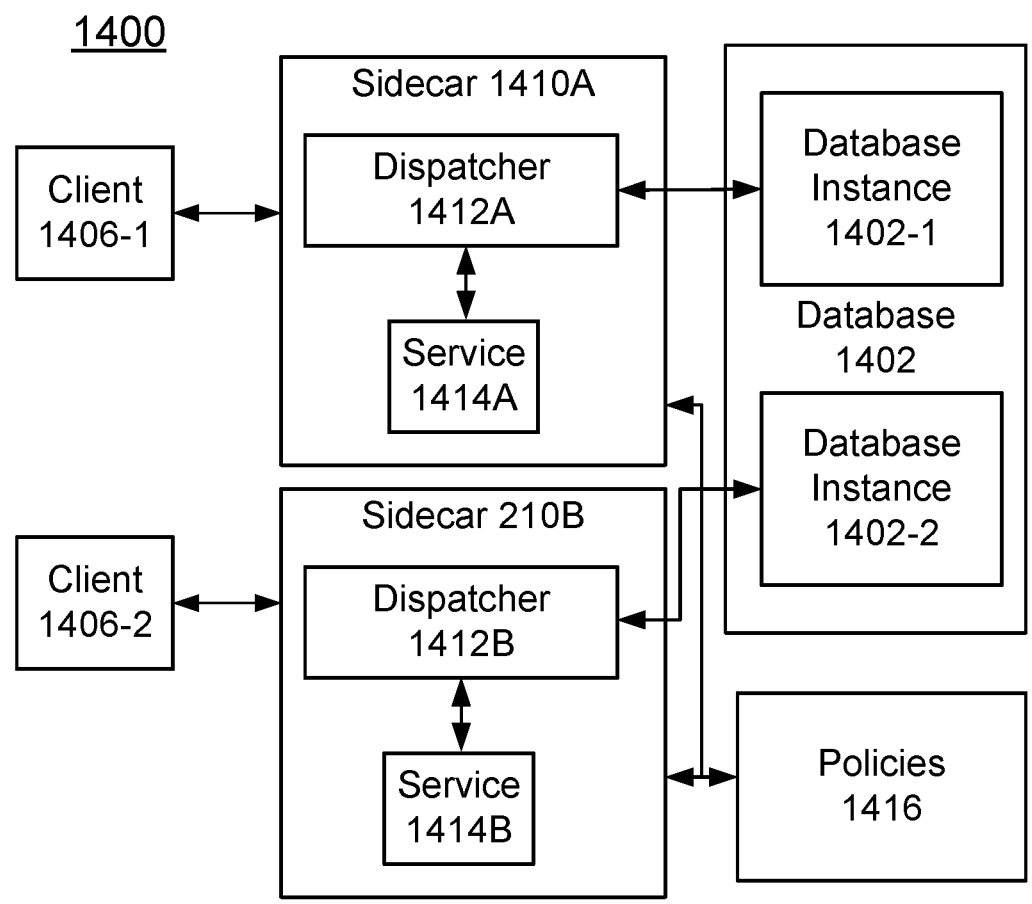
FIG. 14 is another exemplary embodiment of a system including a sidecar usable for stateless proxying.

FIG. 14 is an exemplary embodiment of system 1400 including sidecars for managing access to a database. System 1400 is analogous to system 1300 and includes components that are labeled similarly. System 1400 includes sidecars 1410A and 1410B (collectively sidecars 1410), database 1402 and clients 1406-1 and 1406-2 that are analogous to sidecar 1310, database 1302 and client 1306, respectively. Although a single database 1402 is shown, multiple databases may be present. In the embodiment shown, dispatcher 1412A is considered part of sidecar 1410A, while dispatcher 1412B is part of sidecar 1410B. However, in other embodiments, a single sidecar may be used in place of both sidecars 1410A and 1410B (collectively, sidecars 1410). Similarly, a single dispatcher may be used in place of both dispatchers 1412A and 1412B (collectively, dispatchers 1412). System 1400 also explicitly includes services 1414A and 1414B (collectively, service 1414) and policies 1416.

Clients 1406-1 and 1406-2 (collectively clients 1406) are analogous to client 1306. Database 1402 is analogous to database 1302. Sidecars 1410 and dispatchers 1412 are analogous to sidecar 1310 and dispatcher 1312. Thus, sidecar 1410A is data agnostic, stateless and manages a connection between database instance 1402-1 and client 1406-1. Dispatcher 1412A passes communications for the connection between client 1406-1 and database instance 1402-1. For example, dispatcher 1412A may listen for, intercept and pass all incoming and/or outgoing communications for the connection established between client 1406-1 and database instance 1402-1. Dispatcher 1412A does not perform load balancing and may be an OSI level 4 component. Similarly, sidecar 1410B is data agnostic, stateless and manages a connection between database instance 1402-2 and client 1406-2. Sidecar 1412B passes communications for the connection established between client 1406-2 and database instance 1402-2. For example, dispatcher 1412B may listen for, intercept and pass all incoming and/or outgoing communications for the connection between client 1406-2 and database instance 1402-2. Sidecar 1410B does not perform load balancing. Dispatcher 1412B may be an OSI level 4 component.

In addition, services 1414A and 1414B (collectively services 1414), as well as policies 1416, are explicitly shown in system 1400. Policies 1416 may be stored on a central control plane, provided from third parties, and/or maintained separately from sidecars 1412 in some embodiments. Services 1414 are OSI Layer 7 components in some embodiments. Service 1414A and/or 1414B may asynchronously perform analysis and/or other functions. In addition to passing communications to and/or from database instance 1402-1, sidecar 1412A passes communications to service 1414A. In some embodiments, all communications are passed to service 1414A by sidecar 1412A. In some embodiments, only some of the communications are passed to service 1414A by dispatcher 1412A. Service 1414A may analyze the communication and perform actions such as enforcing policies 1416. Thus, service 1414A may be a policy engine. For example, service 1414A may encrypt and/or decrypt some or all of the communications, perform authentication (e.g. determine whether client 1406-1 is authorized to access data/database 1402 or perform other transactions), instruct dispatcher 1412A to terminate the connection between client 1406-1 and database instance 1402-1 (e.g. if authentication fails), instruct dispatcher 1412A to recall communications passed to database instance 1402-1 (e.g. if client 1406-1 is unauthorized), place limits on the amount and/or type of data provided to client 1406-1 from database instance 1402-1, manage certificates for the connection and/or perform other functions.

Dispatcher 1412B and service 1414B may function in an analogous manner. For example, dispatcher 1412B may pass communications to service 1414B. In some embodiments, dispatcher 1412B passes all communications to service 1414B. In some embodiments, only some of the communications are passed to service 1414B by dispatcher 1412B. Service 1414B may analyze the communication and perform actions such as enforcing policies 1416. For example, service 1414B may encrypt and/or decrypt some or all of the communications, perform authentication (e.g. determine whether client 1406-2 is authorized to access data/database 1402 or perform other transactions), instruct dispatcher 1412B to terminate the connection between client 1406-2 and database instance 1402-2 (e.g. if authentication fails), instruct dispatcher 1412B to recall communications passed to database instance 1402-2 (e.g. if authentication fails), place limits on the amount and/or type of data provided to client 1406-2 from database instance 1402-2, and/or perform other functions. Further, the functions performed by service 1414B need not be the same as those performed by service 1414A.

System 1400 shares the benefits of system 1300. Sidecars 1410 may function as proxies that are stateless and do not perform load balancing. Sidecars 1410 may thus be more easily and inexpensively provided for use in system 1400. The form factor of sidecars 1410 may allow sidecars 1410 to be more readily delivered to and used in system 1400. For example, sidecars 1410 may have forms factor selected from Docker, Kubernetes, cloud lambda, Debian, RPM and/or an analogous format and may be delivered via a container having such a format. Deployment of sidecar 1410 may thus be simplified. Further, sidecars 1410 may be used to provide policy enforcement, security, authentication, encryption, and/or other services asynchronously using services 1414. Sidecars 1410 may also be data agnostic and, therefore, usable with a variety of databases 1402. Further, sidecars 1410 may be used only in conjunction with selected databases 1402. Multiple sidecars 1410 may be configured for multiple connections to one or more databases. Thus, system 1400 may be readily extended to larger numbers of clients and/or additional databases. Further, the level of security and/or functions provided by sidecars 1410 may differ for different databases, different clients and/or different connections. Thus, performance of system 1400 may be enhanced.

Figure 15:
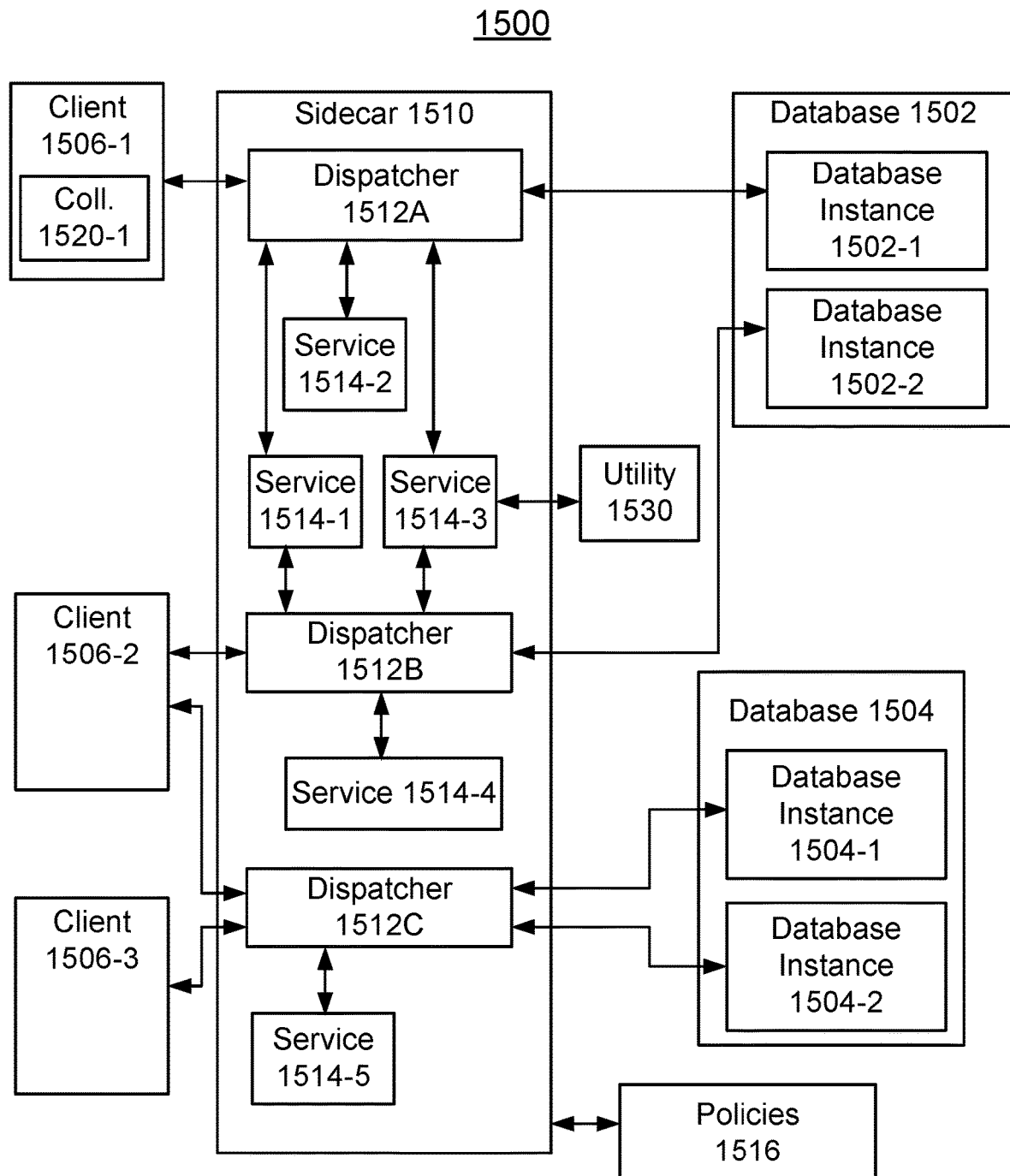
FIG. 15 is another exemplary embodiment of a system including a sidecar usable for stateless proxying.

FIG. 15 is an exemplary embodiment of system 1500 including sidecars for managing access to a database. System 1500 is analogous to systems 1300 and/or 1400 and includes components that are labeled similarly. System 1500 includes sidecar 1510 including dispatchers 1512A, 1512B and 1512C (collectively dispatchers 1512), databases 1502 and 1504 and clients 1506-1, 1506-2 and 1506-3 (collectively clients 1506) that are analogous to sidecars 1312/1412, database 1302/1402 and clients 1306/1406, respectively. In the embodiment shown, client 1506-1 includes collector 1520-1 that is analogous to collectors 320 of FIG. 3. System 1500 also includes services 1514-1, 1514-2, 1514-3, 1514-4 and 1514-5 (collectively services 1514), policies 1516 and utility 1530. Services 1514 are analogous to services 1414, may be OSI Layer 7 components, and may perform functions such as enforcement of policies 1516, authentication, encryption, service management and other activities. Policies 1516 are analogous to policies 1416 and may provide limitations on use of databases 1502 and/or 1504. Utilities 1530 may be used by one or more of services 1514. For example, multifactor authentication or lightweight directory access protocols (LDAP) may be performed using utilities 1530. Utilities 1530 may be part of the organization for databases 1502 and 1504 or may be third-party utilities.

In the embodiment shown, dispatchers 1512 are part of the same sidecar 1510. In the embodiment shown, multiple services 1514 may be utilized by a particular dispatcher 1512A, 1512B or 1512C. Further, dispatchers 1512 may share some or all services 1514. Thus, dispatchers 1512A and 1512B share services 1514-1 and 1514-3. Dispatchers 1512 and services 1514 function in an analogous manner to dispatchers 1412 and services 1414. Although multiple dispatchers 1514 are shown, in some embodiments, a single dispatcher may be used. Sidecar 1510 functions as a stateless proxy for connections between clients 1506 and databases 1502 and 1504.

Dispatcher 1512A is data agnostic, stateless and manages a connection with database instance 1502-1 for client 1506-1. Dispatcher 1512A passes communications for the connection between client 1506-1 and database instance 1502-1. For example, dispatcher 1512A may listen for, intercept and pass all incoming and/or outgoing communications for the connection between client 1506-1 and database instance 1502-1. Dispatcher 1512A does not perform load balancing and may be an OSI level 4 component. Dispatcher 1512B is also data agnostic, stateless and manages a connection between database instance 1502-2 and client 1506-1.

Two dispatchers 1512B and 1512C are used by client 1506-2. Dispatcher 1512B is stateless and passes communications for the connection between client 1506-2 and database instance 1502-2. For example, dispatcher 1512B may listen for, intercept and pass all incoming and/or outgoing communications for the connection between client 1506-2 and database instance 1502-2. Dispatcher 1512B does not perform load balancing, and may be an OSI level 4 component. Dispatcher 1512C is stateless and passes communications for the connection between client 1506-2 and database instance 1504-1 for database 1504. For example, dispatcher 1512C may listen for, intercept and pass all incoming and/or outgoing communications for the connection between client 1506-2 and database instance 1504-1. Dispatcher 1512C does not perform load balancing, and may be an OSI level 4 component.

Dispatcher 1512C is also utilized in proxying the connection between client 1506-3 and database instance 1504-2. Thus, dispatcher 1512C passes communications for the connection between client 1506-2 and database instance 1504-1 for database 1504. For example, dispatcher 1512C may listen for, intercept and pass all incoming and/or outgoing communications for the connection between client 1506-3 and database instance 1504-2. Dispatcher 1512C may be an OSI level 4 component. In addition, dispatcher 1512C performs no load balancing within the connection between client 1506-2 and database instance 1504-1, within the connection between client 1506-3 and database instance 1506-2 and between connections.

System 1500 shares the benefits of system(s) 1300 and/or 1400. Sidecars 1510 may function as proxies that are stateless and do not perform load balancing. Sidecars 1510 may be more easily and inexpensively provided for use in system 1500. Further, sidecars 1510 may be used to provide policy enforcement, security, authentication, encryption, and/or other services using services 1514. Dispatchers 1512 may also be data agnostic and, therefore, usable with a variety of databases 1502. Further, sidecars 1510 and dispatchers 1512 may be used only in conjunction with selected databases 1502 and 1504. Multiple dispatchers 1512 and/or sidecars 1510 may be configured for multiple connections to one or more databases. Thus, system 1500 may be further extended to larger numbers of clients and/or additional databases. The level of security and/or functions provided by sidecar 1510 and dispatchers 1512 may differ for different databases, different clients and/or different connections. Thus, performance of system 1500 may be enhanced.

Figure 16:
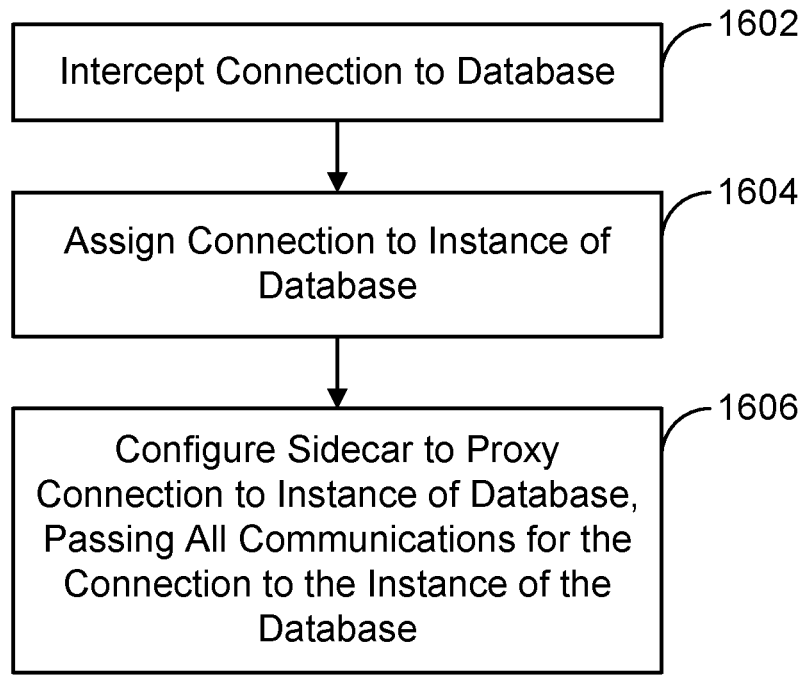
FIG. 16 is a flow chart depicting an exemplary embodiment of a method for providing connection to a database using a sidecar usable for stateless proxying.

FIG. 16 is a flow chart depicting an exemplary embodiment of method 1600 for providing connection to a database using a sidecar. Method 1600 is described in the context of system 1400. However, method 1600 may be used in connection with other systems including but not limited to systems 100, 200, 300, 1300 and/or 1500. For simplicity, certain steps of method 1600 are depicted. Method 1600 may include other and/or additional steps and substeps. Further, the steps of method 1600 may be performed in another order including performing portions or all of some steps in parallel. Method 1600 may be carried out each time a client commences a session for communication with a database.

A connection to a database is intercepted, at 1602. In some embodiments, 1602 includes intercepting a request for a connection to the database. The connection is assigned to an instance of the database, at 1604. Thus, a connection can be established between a client and an instance of the database.

A sidecar is configured to proxy the connection to the database, at 1606. At 1606, the sidecar may be configured to intercept and pass communications for the connection. For example, the database instance and client may be identified for the sidecar at 1606. Thus, the sidecar passes communications to and/or from the database instance. The sidecar may be configured to pass all communications for the connection to the database instance. In some embodiments, the sidecar is configured to pass all communications for the connection from the database instance. In some embodiments, the sidecar passes all communications for the connection if the client has been authenticated. In such embodiments, if the client fails authentication, then communications are not passed and the connection to the client is terminated. In some embodiments, the sidecar passes all communications but recalls the communications if the client fails authentication. At 1606, the sidecar is configured such that the sidecar remains stateless, data agnostic and is only utilized for the connections assigned at 1604. Thus, the sidecar configured at 1606 may be include OSI Layer 4 component and does not perform load balancing within or between connections. The sidecar configured at 1606 may also include or access OSI Layer 7 components to asynchronously perform additional functions.

For example, in system 1400, the connection between client 1406-1 and database 1402 may be intercepted at 1602. Database instance 1402-1 is assigned to the connection with client 1406-1, at 1604. Dispatcher 1412A (and thus sidecar 1410A) is configured at 1606 to proxy the connection between client 1606-1 and database instance 1402-1. Thus, sidecar 1410A is configured for a particular set of communications between client 1406-1 and database instance 1402-1. Further, dispatcher 1412A may utilize services 1414A for communications in the connection.

Using method 1600, a sidecar that is easily and inexpensively deployed for use in a system may be configured for proxying a particular connection. In proxying the connection, the sidecar configured using method 1600 is stateless, does not perform load balancing within or between connections, and may be used to provide policy enforcement, security, authentication, encryption, and/or other services. The sidecar may be data agnostic and usable with a variety of databases. Using method 1600, multiple sidecars may be configured for multiple connections to one or more databases. Thus, performance of a database system may be enhanced.

Figure 17:
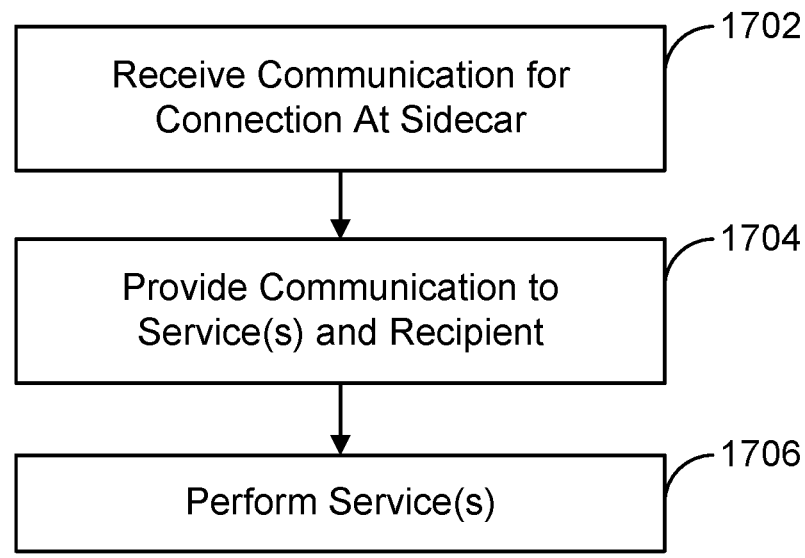
FIG. 17 is a flow chart depicting an exemplary embodiment of a method for providing a service for a connection to a database using a sidecar for providing stateless.

FIG. 17 is a flow chart depicting an exemplary embodiment of method 1700 for providing a service for a connection to a database. Method 1700 is described in the context of system 1400. However, method 1700 may be used in connection with other systems including but not limited to systems 100, 200, 300, 1300 and/or 1500. For simplicity, certain steps of method 1700 are depicted. Method 1700 may include other and/or additional steps and substeps. Further, the steps of method 1700 may be performed in another order including performing portions or all of some steps in parallel. Method 1700 may be performed for sidecars that have been configured for use with a particular connection.

The sidecar receives a communication for the connection, at 1702. The connection may be incoming (to the database) and/or outgoing (from the database). 1702 may include the dispatcher for the sidecar receiving the communication. The communication is passed to the corresponding service(s). In addition, the sidecar may pass the communication to the recipient. For example, the sidecar may provide the communication to the service(s) for analysis and pass the communication on to the database instance. In some embodiments, the communication is substantially immediately passed to the service(s) and the recipient. In some embodiments, the sidecar may hold the communication instead of immediately passing the communication to the recipient. For example, the sidecar might hold the communication until one or more of the service(s) completes analysis of the communication and determines that the communication should be forwarded.

The service(s) performs their function(s), at 1706. For example, analysis of the communication, policy enforcement, data encryption, certificate management, authentication and/or other services may be performed. In some embodiments, 1706 is carried out asynchronously with respect to communications being passed via the connection. Also at 1706, the appropriate action for the sidecar may also be determined and sent to the sidecar/dispatcher, which carries out the action. For example, the sidecar/dispatcher might be instructed to terminate the connection and/or recall communications from the database.

For example, method 1700 may be understood with respect to sidecar 1410-B and the connection between client 1406-2 and database instance 1402-2. Sidecar 1410B may receive a communication from client 1406-2, at 1702. In some embodiments, the communication is received by dispatcher 1412B. The communication may be passed by dispatcher 1412B to database instance 1402-2 and to service 1414B, at 1704. Service 1414B might be used to enforce one or more of policies 1416. Thus, service 1414B may analyze the communication at 1706. Because this analysis is performed independently, for example without requiring that sidecar 1412B hold all communications or suspend communication, service 1414B may be considered asynchronous. Service 1414B may access policies 1416 and compare policies 1416 to characteristics of the communication. Also at 1706, service 1414B determines whether and what action(s) to take based on the policies 1416 and the communication analyzed. For example, the communication may request more data than policies 1416 allow. In such a case, service 1414B may instruct sidecar 1412B to recall the communication or may place limits on the amount of data provided by database instance 1402-2. In some embodiments, service 1414B may perform encryption and/or decryption of data for the communication at 1706.

In some embodiments, service 1414B may authenticate client 1406-2 and allow communication with database instance 1402-2 if the authentication is successful. For example, dispatcher 1412B may hold communications until service 1414B successfully completes authentication. In some embodiments, this is performed via step and stream modes described herein. Thus, dispatcher 1412B may pass communications only if service 1414B successfully completes authentication of client 1406-2. In some embodiments, communications are passed by dispatcher 1412B while service 1414B asynchronously performs authentication. If client 1406-2 is not authenticated, then dispatcher 1412 recalls the communications which have been passed to database instance 1402-2. In some embodiments, service 1414B may utilize digital certificates and/or other mechanisms to perform the authentication.

Using method 1700, desired services may be provided as part of proxying performed by a sidecar. For example, desired policies may be enforced and/or databases may be made more secure. This may be achieved using a sidecar that is easily and inexpensively deployed for use and configured for a particular connection. The sidecar may be data agnostic and usable with a variety of databases. Thus, services provided via method 1700 may be performed for multiple databases having different platforms. Thus, performance of a database system may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   intercepting a connection to a database, wherein the connection is for a client;
   assigning the connection to an instance of the database;

authenticating the client; and configuring a sidecar to proxy the connection to the instance of the database, wherein the sidecar is stateless and passes all communications for the connection for the instance of the database from the sidecar only if the client is authorized, wherein during the intercepting of the connection, the sidecar is in a step mode and stores the communications, and wherein after the client is authorized, the sidecar is placed in a stream mode and forwards the stored communications to the instance of the database.

2. The method of claim 1, wherein the sidecar has a form factor selected from Docker, Kubernetes, cloud lambda, Debian and RPM.

3. The method of claim 1, further comprising:

encrypting at least a portion of the communications for the connection before passing the at least the portion of the communications to the instance of the database.

4. The method of claim 1, wherein the passing further includes:

recalling the communications before processing by the instance of the database if the client is not authorized to access the database.

5. The method of claim 1, wherein the sidecar includes an open systems interconnection (OSI) Layer 4 dispatcher.

6. The method of claim 5, further comprising:

providing at least a portion of the communications to the instance of the database and to at least one OSI Layer 7 service.

7. The method of claim 6, further comprising:

analyzing the at least the portion of the communications by the at least one OSI Layer 7 service; and enforcing at least one policy using the OSI Layer 7 service.

8. A system, comprising:

a processor configured to:

intercept a connection to a database, wherein the connection is for a client;

assign the connection to an instance of the database;

authenticate the client; and configure a sidecar to proxy the connection to the instance of the database, wherein the sidecar is stateless and passes all communications for the connection for the instance of the database from the sidecar only if the client is authorized, wherein during the intercepting of the connection, the sidecar is in a step mode and stores the communications, and wherein after the client is authorized, the sidecar is placed in a stream mode and forwards the stored communications to the instance of the database; and a memory coupled to the processor and configured to provide the processor with instructions.

9. The system of claim 8, wherein the sidecar has a form factor selected from Docker, Kubernetes, cloud lambda, Debian and RPM.

10. The system of claim 8, wherein the processor is further configured to:

encrypt at least a portion of the communications for the connection before passing the at least the portion of the communications.

11. The system of claim 8, wherein the sidecar includes an open systems interconnection (OSI) Layer 4 dispatcher.

12. The system of claim 11, wherein the processor is further configured to:

provide at least a portion of the communications to the instance of the database and to at least one OSI Layer 7 service.

13. The system of claim 12, wherein the processor is further configured to:

analyze the at least the portion of the communications by the at least one OSI Layer 7 service; and enforce at least one policy using the OSI Layer 7 service.

14. A computer program product, the computer program product being embodied in a tangible computer readable storage medium and comprising computer instructions for:

intercepting a connection to a database, wherein the connection is for a client;

assigning the connection to an instance of the database;

authenticating the client; and configuring a sidecar to proxy the connection to the instance of the database, wherein the sidecar is stateless and passes all communications for the connection for the instance of the database from the sidecar only if the client is authorized, wherein during the intercepting of the connection, the sidecar is in a step mode and stores the communications, and wherein after the client is authorized, the sidecar is placed in a stream mode and forwards the stored communications to the instance of the database.

15. The computer program product of claim 14, wherein the sidecar has a form factor selected from Docker, Kubernetes, cloud lambda, Debian and RPM.

16. The computer program product of claim 14, wherein the computer instructions further include computer instructions for:

encrypting at least a portion of the communications for the connection before passing the at least the portion of the communications.

17. The computer program product of claim 14, wherein the sidecar includes an open systems interconnection (OSI) Layer 4 dispatcher.

18. The computer program product of claim 16, wherein the computer instructions further include instructions for:

providing at least a portion of the communications to the instance of the database and to at least one OSI Layer 7 service.

19. The computer program product of claim 17, wherein the computer instructions further include instructions for:

analyzing the at least the portion of the communications by the at least one OSI Layer 7 service; and enforcing at least one policy using the OSI Layer 7 service.

* * * * *

UNITED STATES PATENT AND TRADEMARK OFFICE
CERTIFICATE OF CORRECTION

| | |
|---|---|
| PATENT NO. | : 11,477,197 B2 |
| APPLICATION NO. | : 16/817366 |
| DATED | : October 18, 2022 |
| INVENTOR(S) | : Manav Ratan Mital et al. |

It is certified that error appears in the above-identified patent and that said Letters Patent is hereby corrected as shown below:

On the Title Page

Column 2, Item (56), other publications, cite no. 1, delete "Intrustion" and insert --Intrusion--, therefor.
In page 2, Column 2, Item (56), other publications, cite no. 2, delete "NetCaler" and insert --NetScaler--, therefor.
In page 3, Column 1, Item (56), other publications, cite no. 1, delete "Syste,s" and insert --Systems--, therefor.

Signed and Sealed this
Seventeenth Day of October, 2023

Katherine Kelly Vidal
*Director of the United States Patent and Trademark Office*